(12) United States Patent
Bakr et al.

(10) Patent No.: US 12,206,616 B1
(45) Date of Patent: Jan. 21, 2025

(54) DUPLEXING TRANSCEIVERS, SYSTEM, AND METHODS FOR OPTIMIZING THE CAPACITY OF ADAPTIVE COMMUNICATION SYSTEMS

(71) Applicant: Tarana Wireless, Inc., Santa Clara, CA (US)

(72) Inventors: Omar Bakr, Los Altos, CA (US); Dale Branlund, Portola Valley, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 445 days.

(21) Appl. No.: 17/326,780

(22) Filed: May 21, 2021

Related U.S. Application Data

(60) Division of application No. 15/640,980, filed on Jul. 3, 2017, now Pat. No. 11,025,394, which is a continuation of application No. 14/214,229, filed on Mar. 14, 2014, now Pat. No. 9,735,940, which is a continuation-in-part of application No. 13/445,863, filed on Apr. 12, 2012, now Pat. No. 9,252,908, and (Continued)

(51) Int. Cl.
| | |
|---|---|
| H04L 5/00 | (2006.01) |
| H04B 7/0408 | (2017.01) |
| H04B 7/0417 | (2017.01) |
| H04B 7/06 | (2006.01) |
| H04J 3/16 | (2006.01) |
| H04L 5/14 | (2006.01) |
| H04W 4/06 | (2009.01) |

(52) U.S. Cl.
CPC ......... *H04L 5/0053* (2013.01); *H04B 7/0408* (2013.01); *H04B 7/0417* (2013.01); *H04B 7/0695* (2013.01); *H04J 3/1694* (2013.01); *H04L 5/1438* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 205,493 A | 7/1879 | Macfarlane | |
| 5,889,814 A * | 3/1999 | Simmons | H04L 5/14 370/252 |

(Continued)

FOREIGN PATENT DOCUMENTS

| | | | |
|---|---|---|---|
| EP | 2071745 A1 | 6/2009 | |
| EP | 1865642 A1 | 12/2017 | |

(Continued)

OTHER PUBLICATIONS

Communication pursuant to Article 94(3) EPC dated Sep. 1, 2021 in connection with European patent application No. 16153704.8, 11 pages.

(Continued)

*Primary Examiner* — Chi H Pham
*Assistant Examiner* — Raul Rivas
(74) *Attorney, Agent, or Firm* — Stoel Rives LLP

(57) ABSTRACT

A wireless communications system that uses adaptive arrays is disclosed in which the capacity is optimized. A method for optimizing the capacity of a wireless communications system that uses adaptive arrays is also disclosed. The wireless communication system may be a point to multi-point (P2MP) and/or a multi-point to multi-point (MP2MP) STAP system.

23 Claims, 26 Drawing Sheets

Related U.S. Application Data a continuation-in-part of application No. 13/445,869, filed on Apr. 12, 2012, now Pat. No. 9,456,354, and a continuation-in-part of application No. 13/445,861, filed on Apr. 12, 2012, now Pat. No. 9,325,409.

(60) Provisional application No. 61/789,892, filed on Mar. 15, 2013.

(56) References Cited

U.S. PATENT DOCUMENTS

| | | | |
|---|---|---|---|
| 6,122,260 | A | 9/2000 | Liu et al. |
| 6,219,561 | B1 | 4/2001 | Raleigh |
| 6,289,062 | B1 | 9/2001 | Wang et al. |
| 6,580,328 | B2 | 6/2003 | Tan et al. |
| 6,771,985 | B1 | 8/2004 | Iinuma |
| 6,795,424 | B1 | 9/2004 | Kapoor et al. |
| 6,865,169 | B1 | 3/2005 | Quayle et al. |
| 7,003,310 | B1 | 2/2006 | Youssefmir et al. |
| 7,054,292 | B2 | 5/2006 | Hall et al. |
| 7,155,183 | B2 | 12/2006 | Abraham |
| 7,187,723 | B1 | 3/2007 | Kawanabe |
| 7,333,455 | B1 | 2/2008 | Bolt et al. |
| 7,340,279 | B2 | 3/2008 | Chen et al. |
| 7,366,120 | B2 | 4/2008 | Handforth et al. |
| 7,469,152 | B2 | 12/2008 | Cetiner et al. |
| 7,493,129 | B1 | 2/2009 | Mostafa et al. |
| 7,502,355 | B2 | 3/2009 | Bednekoff et al. |
| 7,567,543 | B2 | 7/2009 | Cao et al. |
| 7,603,081 | B2 | 10/2009 | Karabinis |
| 7,636,552 | B2 | 12/2009 | Monk |
| 7,640,020 | B2 | 12/2009 | Gutowski |
| 7,646,752 | B1 | 1/2010 | Periyalwar et al. |
| 7,688,739 | B2 | 3/2010 | Frei et al. |
| 7,693,482 | B2 | 4/2010 | Eade |
| 7,720,444 | B2 | 5/2010 | Darabi et al. |
| 7,839,856 | B2 | 11/2010 | Sinha et al. |
| 7,953,389 | B2 | 5/2011 | Coleman et al. |
| 8,195,224 | B2 | 6/2012 | Saban et al. |
| 8,238,318 | B1 | 8/2012 | Negus |
| 8,340,235 | B2 | 12/2012 | Maddah-Ali et al. |
| 8,416,872 | B2 | 4/2013 | Higuchi et al. |
| 8,488,728 | B2 | 7/2013 | Maddah-Ali et al. |
| 8,502,733 | B1 | 8/2013 | Negus et al. |
| 8,531,471 | B2 | 9/2013 | Chen et al. |
| 8,654,815 | B1 | 2/2014 | Forenza et al. |
| 8,670,390 | B2 | 3/2014 | Shattil |
| 8,811,348 | B2 | 8/2014 | Rangan et al. |
| 8,837,305 | B2 | 9/2014 | Nanda et al. |
| 9,124,381 | B2 | 9/2015 | Karabinis |
| 9,131,529 | B1 | 9/2015 | Ayyagari et al. |
| 9,252,908 | B1 | 2/2016 | Branlund |
| 9,325,409 | B1 | 4/2016 | Branlund |
| 9,332,465 | B2 | 5/2016 | Valliappan et al. |
| 9,356,358 | B2 | 5/2016 | Chang et al. |
| 9,363,847 | B2 | 6/2016 | Charbit et al. |
| 9,386,465 | B2 | 7/2016 | Forenza et al. |
| 9,456,354 | B2 | 9/2016 | Branlund |
| 9,502,022 | B2 | 11/2016 | Chang et al. |
| 9,735,940 | B1 | 8/2017 | Bakr et al. |
| 9,819,083 | B1 | 11/2017 | Chen et al. |
| 9,853,668 | B2 | 12/2017 | Corbalis et al. |
| 9,854,408 | B2 | 12/2017 | Suthar et al. |
| 9,923,657 | B2 | 3/2018 | Forenza et al. |
| 9,973,246 | B2 | 5/2018 | Forenza et al. |
| 10,056,963 | B1 | 8/2018 | Au |
| 10,164,698 | B2 | 12/2018 | Forenza et al. |
| 10,181,330 | B2 | 1/2019 | Han et al. |
| 10,348,394 | B1 | 7/2019 | Bakr et al. |
| 10,432,275 | B2 | 10/2019 | Branlund |
| 11,025,394 | B1 | 6/2021 | Bakr et al. |
| 11,115,111 | B1 | 9/2021 | Bakr et al. |
| 11,831,372 | B2 | 11/2023 | Branlund |
| 2001/0028675 | A1 | 10/2001 | Bierly et al. |
| 2002/0042290 | A1 | 4/2002 | Williams et al. |
| 2002/0154687 | A1 | 10/2002 | Bierly et al. |
| 2003/0035468 | A1 | 2/2003 | Corbaton et al. |
| 2003/0228887 | A1 | 12/2003 | Kishigami et al. |
| 2004/0087275 | A1 | 5/2004 | Sugar et al. |
| 2004/0142701 | A1 | 7/2004 | Abraham |
| 2004/0192199 | A1 | 9/2004 | Eade |
| 2004/0264393 | A1 | 12/2004 | Desgagne et al. |
| 2005/0078038 | A1 | 4/2005 | Takaki et al. |
| 2005/0141624 | A1 | 6/2005 | Lakshmipathi et al. |
| 2005/0245192 | A1 | 11/2005 | Karabinis |
| 2005/0265273 | A1 | 12/2005 | Karabinis et al. |
| 2006/0040615 | A1 | 2/2006 | Mohamadi |
| 2006/0119440 | A1 | 6/2006 | Isobe et al. |
| 2006/0135070 | A1 | 6/2006 | Karabinis |
| 2006/0268769 | A1 | 11/2006 | Pan et al. |
| 2006/0280116 | A1 | 12/2006 | Ji et al. |
| 2006/0292990 | A1 | 12/2006 | Karabinis et al. |
| 2007/0052353 | A1 | 3/2007 | Yang et al. |
| 2007/0058584 | A1 | 3/2007 | Sutskover |
| 2007/0081489 | A1 | 4/2007 | Anderson et al. |
| 2007/0087690 | A1 | 4/2007 | Karabinis |
| 2007/0082142 | A1 | 7/2007 | Classon et al. |
| 2008/0076477 | A1 | 3/2008 | Hedayat et al. |
| 2008/0117101 | A1 | 5/2008 | Pan |
| 2008/0130496 | A1 | 6/2008 | Kuo et al. |
| 2008/0214196 | A1 | 9/2008 | Sambhwani et al. |
| 2008/0214218 | A1 | 9/2008 | Lakshmanan |
| 2008/0233967 | A1 | 9/2008 | Montojo et al. |
| 2008/0247388 | A1 | 10/2008 | Horn |
| 2008/0261602 | A1 | 10/2008 | Livneh |
| 2008/0278394 | A1 | 11/2008 | Koh et al. |
| 2008/0317014 | A1 | 12/2008 | Veselinovic et al. |
| 2009/0052353 | A1 | 2/2009 | D'Amico et al. |
| 2009/0110033 | A1 | 4/2009 | Shattil |
| 2009/0147742 | A1 | 6/2009 | Tsai et al. |
| 2009/0185632 | A1 | 7/2009 | Cai et al. |
| 2009/0310693 | A1 | 12/2009 | Baker et al. |
| 2009/0316675 | A1 | 12/2009 | Malladi et al. |
| 2010/0035620 | A1 | 2/2010 | Naden et al. |
| 2010/0046595 | A1 | 2/2010 | Sikri et al. |
| 2010/0048217 | A1 | 2/2010 | Deshpande et al. |
| 2010/0056059 | A1 | 3/2010 | Lakshmanan et al. |
| 2010/0067476 | A1 | 3/2010 | Periyalwar et al. |
| 2010/0087149 | A1 | 4/2010 | Srinivasan et al. |
| 2010/0093391 | A1 | 4/2010 | Saban et al. |
| 2010/0124183 | A1* | 5/2010 | Sorond ............. H04J 3/22 370/280 |
| 2010/0195619 | A1 | 8/2010 | Bonneville et al. |
| 2010/0215032 | A1 | 8/2010 | Jalloul et al. |
| 2010/0248644 | A1 | 9/2010 | Kishi et al. |
| 2010/0254295 | A1 | 10/2010 | Lee et al. |
| 2010/0296459 | A1 | 11/2010 | Miki et al. |
| 2011/0034200 | A1 | 2/2011 | Leabman |
| 2011/0039509 | A1 | 2/2011 | Bruchner |
| 2011/0051731 | A1 | 3/2011 | Mang et al. |
| 2011/0075601 | A1 | 3/2011 | Zheng |
| 2011/0105054 | A1 | 5/2011 | Cavin |
| 2011/0142025 | A1 | 6/2011 | Agee et al. |
| 2011/0211615 | A1 | 9/2011 | Hamamura |
| 2011/0269410 | A1 | 11/2011 | Tsujimoto et al. |
| 2011/0274032 | A1 | 11/2011 | Leng et al. |
| 2012/0094679 | A1 | 4/2012 | Rao et al. |
| 2012/0108257 | A1 | 5/2012 | Kwon et al. |
| 2012/0129539 | A1 | 5/2012 | Arad et al. |
| 2012/0136670 | A1 | 5/2012 | Ishikawa et al. |
| 2012/0202546 | A1 | 8/2012 | Nakayama |
| 2012/0257551 | A1 | 10/2012 | Diao et al. |
| 2012/0294203 | A1* | 11/2012 | Koorapaty ............ H04L 1/0002 370/280 |
| 2012/0319844 | A1 | 12/2012 | Van Doorn |
| 2013/0044028 | A1 | 2/2013 | Lea et al. |
| 2013/0094522 | A1 | 4/2013 | Moshfeghi |
| 2013/0095747 | A1 | 4/2013 | Moshfeghi |
| 2013/0109372 | A1 | 5/2013 | Ekici |
| 2013/0142136 | A1 | 6/2013 | Pi et al. |
| 2013/0207841 | A1 | 8/2013 | Negus et al. |
| 2013/0237261 | A1 | 9/2013 | Bazzi et al. |
| 2013/0259113 | A1 | 10/2013 | Kumar |
| 2013/0272132 | A1 | 10/2013 | Heo et al. |

(56) References Cited

U.S. PATENT DOCUMENTS

| | | | |
|---|---|---|---|
| 2013/0343356 A1 | 12/2013 | Bai et al. | |
| 2014/0036742 A1* | 2/2014 | Charbit | H04W 72/1263 370/280 |
| 2014/0162667 A1 | 6/2014 | Mueck | |
| 2014/0185496 A1 | 7/2014 | Wolf et al. | |
| 2014/0206367 A1 | 7/2014 | Agee et al. | |
| 2014/0269492 A1 | 9/2014 | Forenza et al. | |
| 2014/0269502 A1 | 9/2014 | Forenza et al. | |
| 2014/0328423 A1 | 11/2014 | Agee et al. | |
| 2015/0085713 A1 | 3/2015 | He et al. | |
| 2015/0103702 A1 | 4/2015 | Lahetkangas et al. | |
| 2015/0124713 A1 | 5/2015 | Salhov et al. | |
| 2015/0244458 A1 | 8/2015 | Erkmen et al. | |
| 2015/0326380 A1 | 11/2015 | Verbin et al. | |
| 2016/0119052 A1 | 4/2016 | Frerking et al. | |
| 2016/0134337 A1 | 5/2016 | Branlund | |
| 2016/0135060 A1 | 5/2016 | Branlund | |
| 2016/0255605 A1 | 9/2016 | Kyeong et al. | |
| 2016/0301458 A1 | 10/2016 | Petersson et al. | |
| 2016/0323894 A1 | 11/2016 | Shen et al. | |
| 2017/0013476 A1 | 1/2017 | Suthar et al. | |
| 2017/0163325 A1 | 6/2017 | Kang et al. | |
| 2018/0249453 A1 | 8/2018 | Nagaraja et al. | |
| 2018/0262936 A1 | 9/2018 | Zhou et al. | |
| 2018/0279316 A1 | 9/2018 | Mueck et al. | |
| 2018/0287833 A1 | 10/2018 | Kennedy | |
| 2019/0068235 A1 | 2/2019 | Branlund et al. | |
| 2019/0349992 A1 | 11/2019 | Zhang et al. | |
| 2020/0106499 A1 | 4/2020 | Branlund | |
| 2022/0029697 A1 | 1/2022 | Bakr | |

FOREIGN PATENT DOCUMENTS

| | | | | |
|---|---|---|---|---|
| GB | 2350265 A | | 11/2000 | |
| JP | 2010-522516 | | 7/2010 | |
| JP | 2010522516 A | | 7/2010 | |
| JP | 2010525678 A | | 7/2010 | |
| JP | 2010183573 A | | 8/2010 | |
| PT | 1858175 E | * | 9/2012 | H08B 7/08 |
| WO | 9820633 A2 | | 5/1998 | |
| WO | 2008033369 A2 | | 3/2000 | |
| WO | 0205493 A2 | | 1/2002 | |
| WO | 02063896 A1 | | 8/2002 | |
| WO | 2005101882 A1 | | 10/2005 | |
| WO | 2007082142 A2 | | 7/2007 | |
| WO | 2009119463 A2 | | 10/2009 | |
| WO | 2010003509 A1 | | 1/2010 | |
| WO | 2010013245 A1 | | 2/2010 | |
| WO | 2012037643 A1 | | 3/2012 | |

OTHER PUBLICATIONS

Mesecher, David, "A physical layer open architecture for communications systems integration: common baseband processor with multiple-access adaptively steered antenna array", IEEE, 2008, doi: 10.1109/LISAT.2008.4638943., May 2, 2008, pp. 1-10.

Clark;, V. Martin, "Adaptive Frequency-Domain Equalization and Diversity Combining for Broadband Wireless Communications", IEEE Journal vol. 16 No. 8, Oct. 1998, pp. 1385-1395.

Gong, Michelle X., "Load- and Interference-Aware Channel Assignment for Dual-Radio Mesh Backhauls", IEEE Communications Society, 2008, pp. 1-6.

Nasr, Karim M., et al., "Echo Cancellation and Channel Estimation for On-Channel Repeaters in DVB-T/H Networks", Brunel University, Jan. 2006, pp. 1-6.

Savvides, Andreas , et al., "The Bits and Flops of the N-hop Multilateration Primitive for Node Localization Problems", UCLA, Sep. 28, 2002, pp. 1-10S.

Winters, Jack H., "Signal Acquisition and Tracking with Adaptive Arrays in the Digital Mobile Radio System IS-54 with Flat Fading", IEEE Transactions, Nov. 4, 1993, pp. 377-384.

"Echo Cancellation and Channel Estimation for On-Channel Repeaters in DVB-T/H Networks" by Karim M. Nasr et al.; Brunel University; dated after Jan. 2006, Jan. 1, 2006.

"Load- and Interference-Aware Channel Assignment for Dual-Radio Mesh Backhauls" by Michelle X. Gong et al.; IEEE Communications Society; dated 2008, Jan. 1, 2008.

"Adaptive Frequency-Domain Equalization and Diversity Combining for Broadband Wireless Communications" by Martin V. Clark; IEEE Journal; dated Oct. 1998, Oct. 1, 1998.

"Signal Acquisition and Tracking with Adaptive Arrays in the Digital Mobile Radio System IS-54 with Flat Fading" by Jack H. Winters; IEEE Transactions; dated Nov. 4, 1993, Nov. 4, 1993.

PCT International Preliminary Report on Patentability of PCT/US14/26696; dated Sep. 15, 2015 (1 pg.), Sep. 15, 2015.

PCT International Search Report of PCT/US14/26696; dated Sep. 19, 2014; (2 pgs.), Sep. 19, 2014.

PCT Written Opinion of the International Searching Authority of PCT/US14/26696; dated Sep. 19, 2014; (4 pgs.), Sep. 19, 2014.

"The Bits and Flops of the N-hop Multilateration Primitive for Node Localization Problems" by Andreas Savvides et al.; UCLA; dated Sep. 28, 2002, Sep. 28, 2002.

* cited by examiner

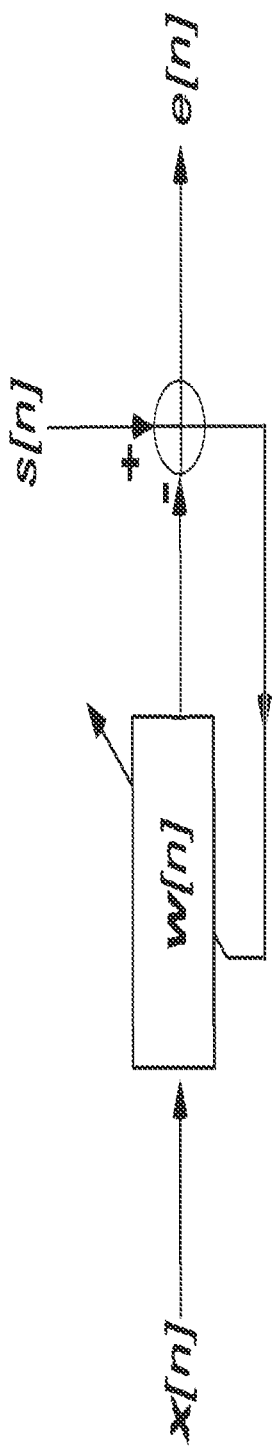

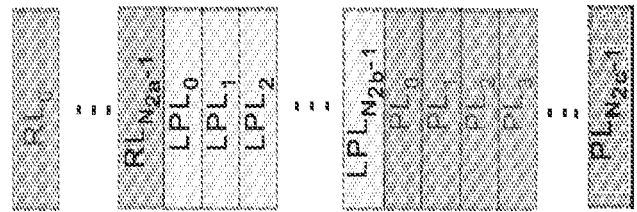
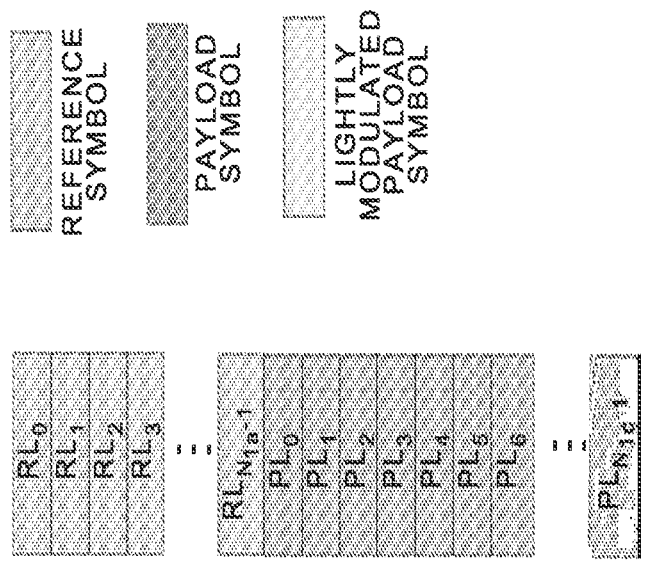
Figure 10B
Figure 10A

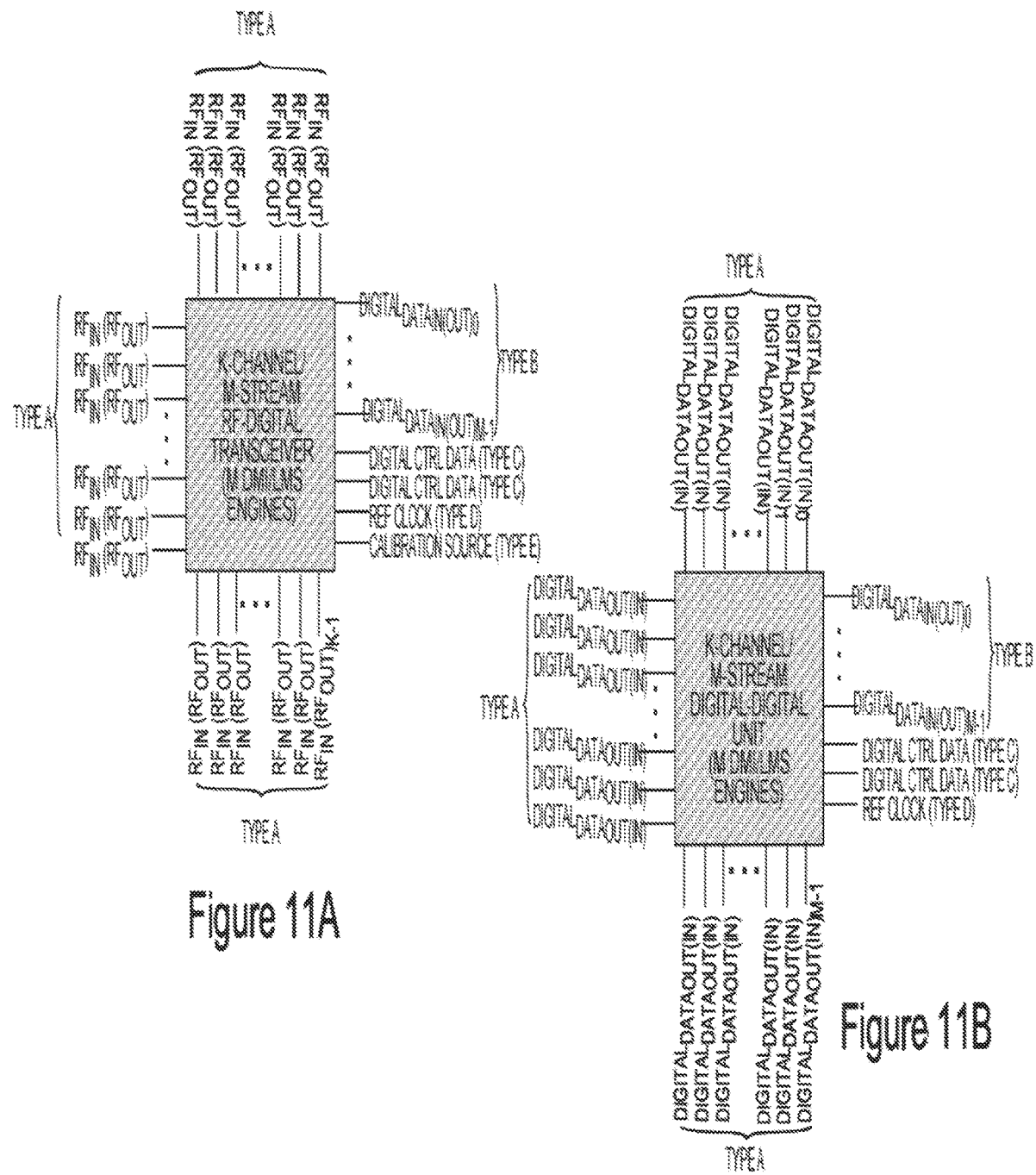

PLANAR (FLAT PANEL) ARRAYS OF SQUARE PATCHES

DUPLEXING TRANSCEIVERS, SYSTEM, AND METHODS FOR OPTIMIZING THE CAPACITY OF ADAPTIVE COMMUNICATION SYSTEMS

CROSS-REFERENCE TO RELATED APPLICATION(S)

This application is a divisional of U.S. patent application Ser. No. 15/640,980, filed Jul. 3, 2017 and is a continuation of U.S. patent application Ser. No. 14/214,229, filed Mar. 14, 2014, which claims the benefit of U.S. Provisional Application 61/789,892, filed Mar. 15, 2013, the entirety of each of which is incorporated herein by reference in the entirety and for all purposes. U.S. patent application Ser. No. 14/214, 229 is also a continuation in part of U.S. patent application Ser. Nos. 13/445,861, filed Apr. 12, 2012, which issued Apr. 26, 2016 as U.S. Pat. No. 9,325,409, Ser. No. 13/445,863, filed Apr. 12, 2012, which issued Feb. 2, 2016 as U.S. Pat. No. 9,252,908, and Ser. No. 14/445,869, filed Apr. 12, 2012, which issued Sep. 27, 2016 as U.S. Pat. No. 9,456,354, the entirety of each of which is incorporated herein by reference in the entirety and for all purposes.

FIELD

The disclosure relates generally to wireless communications systems and in particular to a wireless communications system that uses an adaptive antenna array.

BACKGROUND

Today's wireless networks suffer from capacity shortages due to the large proliferation of data-hungry devices like smart phones, tablets, and notebooks. The number of devices accessing the data-network is expected to increase at an exponential rate in the years to come. Even when the number of devices on the network begins to saturate, the applications driving the data demand will continue to grow. These applications include on-line gaming, video conferencing, high definition video, and file sharing and these applications vary in their latency and bandwidth requirements.

Even though integrated circuit technology continues to improve at an exponential rate following Moore's law, the spectrum scarcity makes it difficult for today's wireless networks to fully leverage the available computing power to cope with growing data demand. The effectiveness of multiple input, multiple output (MIMO) techniques are highly dependent on channel characteristics. For example, most outdoor channels, where most of the capacity crunch is taking place, lack the diversity necessary to deliver the capacity improvement promised by MIMO.

Many companies are focusing their attention on the vastly under-utilized bands at higher frequencies operating at millimeter-waves (mm-Wave) like 60 GHz as a potential for alleviating the capacity crunch, especially since most recent advances in silicon technology made radio transceivers at those bands very cost-effective. However, the poor propagation characteristics make it difficult to use these bands in access networks.

Multi-antenna beamforming technology with multiuser spatial beamfoming offers a potential solution for alleviating the capacity crunch. Beamforming can significantly improve the spatial use in lower frequency bands and improve the propagation and coverage at higher frequency bands (e.g. mm-Wave). Unlike MIMO, the capacity gains are less dependent on the wireless environment. Multi-antenna wideband beamforming technology is sometimes referred to as space-time adaptive processing (STAP).

The performance of STAP improves with the number of antennas. However, the amount of processing and training required to find the optimal spatial filters (i.e. weights for each antenna) also grows with the number of antennas. The amount of processing can either be quadratic or cubic in the number of antennas depending on the desired accuracy. The amount of required training, also known as the time-bandwidth product, grows linearly with the number of antennas.

The processing overhead can be reduced with the advancement of silicon technology. However, the training overhead reduces the effective throughput of the system and is independent of technology. If the wireless links are static, then the system has an infinite amount time to find the optimal weights. However, in practice, the channels change with time. The average time in which the channel remains relatively static is known as the coherent time. The ratio of the amount of the time required to train the adaptive antenna array (i.e. the time-bandwidth product) to the coherence time, represents the additional overhead. This overhead can somewhat be reduced by using the actual payload (i.e. transmitted data) for training in addition to known pilot symbols, but this also comes with some performance degradation and added latency.

BRIEF DESCRIPTION OF THE DRAWINGS

FIG. 8 illustrates an example of a MMSE adaptive filter;

FIGS. 10A and 10B illustrate an example of a first and second subframe, respectively, of a communication protocol;

FIGS. 11A and 11B illustrate examples of two implementations of a beamformer;

DETAILED DESCRIPTION OF ONE OR MORE EMBODIMENTS

Figure 1A:
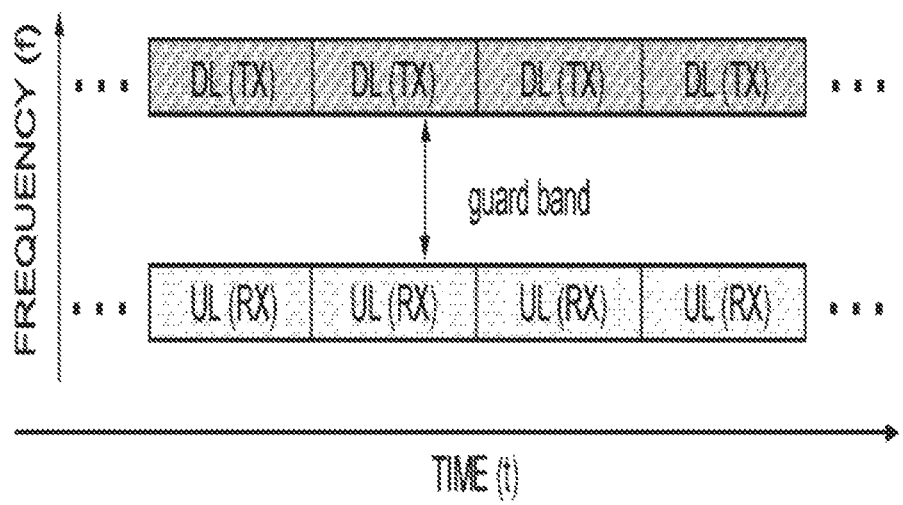
FIGS. 1A and 1B illustrate a frequency division duplexing and a time division duplexing technique, respectively.

For purposes of the disclosure below, the following abbreviations may be used:
- AAS—Adaptive Antenna System
- ACLR—Adjacent Channel Leakage Ratio
- ADC—Analog to Digital Converter
- AM—Amplitude Modulation
- AOA—Angle Of Arrival
- AOD—Angle Of Departure
- ARQ—Automatic Repeated reQuest
- BPSK—Binary Phase Shift Keying
- BS—Base station
- CAZAC—Constant Amplitude Zero Auto Correlation
- CDM—Code Division Multiplexing
- CDMA—Code Division Multiple Access
- CINR—Carrier to Interference and Noise Ratio
- CIR—Carrier to Interference Ratio
- CNR—Carrier to Noise Ratio
- CN—Concentrating Node
- CP—Cyclic Prefix
- CPU—Central Processing Unit
- CS—Cyclic Suffix
- CSC—Cyclic Single Carrier
- CSI—Channel State Information
- CTC—Convolutional Turbo Codes
- DAC—Digital to Analog Converter
- DFT—Discrete Fourier Transform
- DL—Downlink
- DMI—Direct Matrix Inversion
- DOA—Direction of Arrival.
- DOF—Degree Of Freedom
- DOD—Direction of Departure
- DPD—Digital Predistortion
- DSP—Digital Signal Processing
- EIRP—Effective Isotropic Radiated Power
- EN—End Node
- EVD—Eigen Value Decomposition
- EVM—Error Vector Magnitude
- FDD—Frequency Division Duplex.
- FDM—Frequency Division Multiplexing
- FDMA—Frequency Division Multiple Access
- FFT—Fast Fourier Transform
- FM—Frequency Modulation
- FPGA—Field Programmable Gated Array
- FSK—Frequency Shift Keying
- GPS—Global Positioning System
- HARQ—Hybrid ARQ
- ICI—Intercarrier Interference
- IDFT—Inverse Discrete Fourier Transform
- IF—Intermediate Frequency
- IFFT—Inverse Fast Fourier Transform
- ISI—InterSymbol Interference
- LDPC—Low Density Parity Check Codes
- LMS—Least Mean Square
- LNA—Low Noise Amplifier
- LOS—Line of sight
- LTE—Long Term Evolution
- MCS—Modulation and Coding Scheme
- MGSO—Modified Gram-Schmidt Orthogonalization
- MIMO—Multiple Input Multiple Output
- MMSE—Minimum Mean Squared Error
- MP2MP—Multi-point to Multi-point.
- MP2P—Multiple Point-to-Point
- MS—Mobile station
- NLOS—non-Line of sight
- nLOS—near Line of Sight
- OFDM—Orthogonal Frequency Division Multiplexing
- OFDMA—Orthogonal Frequency Division Multiple Access
- P2MP—Point to Multi-point
- P2P—Point to Point
- PA—Power Amplifier
- PAM—Pulse Amplitude Modulation.
- PAPR—Peak to Average Power Ratio
- PM—Phase Modulation
- PSK—Phase Shift Keying
- PU—Processing Unit
- Q—Quality Factor
- QAM—Quadrature Amplitude Modulation
- QoS—Quality of Service
- QPSK—Quadrature Phase Shift Keying
- RF—Radio Frequency
- RFPD—RF Predistortion
- RLS—Recursive Least Squares
- RMGSO—Recursive Modified Gram-Schmidt Orthogonalization
- RTG—Receive Time Guard
- RTT—Round Trip Time
- RX—Receiver
- SINR—Signal to Interference and Noise Ratio
- SIR—Signal to Interference Ratio
- SNR—Signal to Noise Ratio
- SoC—System on Chip
- STAP—Space Time Adaptive Processing
- SVD—Singular Value Decomposition.
- TBP—Time-Bandwidth Product
- TDD—Time Division Duplex
- TDM—Time Division Multiplexing
- TDMA—Time Division Multiple Access.
- TFS—Time-Frequency Synchronization
- TG—Time Guard
- TTG—Transmit Time Guard
- TX—Transmitter
- UL—Uplink
- WiFi—Wireless Fidelity
- WiMAX—Worldwide Interoperability for Microwave Access
- WLAN—Wireless Local Area Network System Overview The system is general wireless data transport network that may be a point to point (P2P), point to multi-point (P2MP) and a multi-point to multi-point (MP2MP) STAP system that uses adaptive arrays. An example of a topology of the system is shown in FIG. 19 in which the system has two types of nodes including a central or concentrating node (CN) or CBR in FIG. 18 and an end node (EN) or TBR in FIG. 18. The CNs are usually connected to the main wired network through some high capacity/low latency connection (e.g. fiber or microwave). ENs connect back to the wired network wirelessly through the CNs. Each CN contains at least one two antennas and each EN contains at least one antenna. Each CN has one or more ENs attached to it as shown in FIG. 19, and each EN can associate with one or more CNs. Nodes of the same type need not be homogeneous (i.e. they differ in the number of antennas, antenna/array geometry, number of beams, bandwidth, and signal processing capability). ENs do not associate with other ENs and CNs do not associate with other CNs. The CN multiplexes the data to its ENs attached either in space, time, code, frequency, or some combination of both. Similarly, the EN multiplexes its data to the CNs is attached to either spatially, or in time, frequency, or code or some combination of both. Each EN associates with multiple CN either to increase its capacity or to improve its reliability and diversity. The link between an EN and a CN can either be composed of a single stream or multiple streams separated (MIMO) in polarization, space, along multiple propagation paths (multipath) or some other antenna property (if the channel conditions permit). The CNs can either split or reuse the channel (e.g. spectrum resources). The spectrum may also be unlicensed or shared with other applications. The network can be extended to include multiple hops. However, the additional hops do not increase the capacity of the network. The network is not restricted to any particular frequency band (e.g. 2 GHz, 20 GHz, 60 GHz, etc.), being licensed or unlicensed, or signal bandwidth (e.g. 10 MHz, 100 MHz, 1 GHz . . . ), propagating environment (e.g. indoor/outdoor, urban/suburban/rural, LOS/NLOS/nLOS, fixed/mobile), as long as the hardware is capable. In fact, the network can be a hybrid of all of the above.

The designation of a node as an EN or CN are defined with respect to a particular channel resource (i.e. time/frequency). For example, in one frequency band, a node can be acting as a CN, while an EN in another. Therefore, the overall network topology can be different (e.g. a mesh) when all the channel resources are considered.

In the system, each concentrator node aggregates traffic from L full bandwidth TBRs (ENs) with capacity Q for a total of L*Q bps. Note that the P2CMP also embodies the notion of L*$L_{sb}$ TBRs links with capacity Q/$L_{sb}$ connected to the CBR where $L_{sb}$ is the number of subbands using either frequency division multiplexing (FDM) or time division multiplexing (TDM). Each TBR is attached to the micro or pico base station thus providing wireless backhaul connectivity. The physical connection with the TBR is via the native output of the base station.

Figure 18:
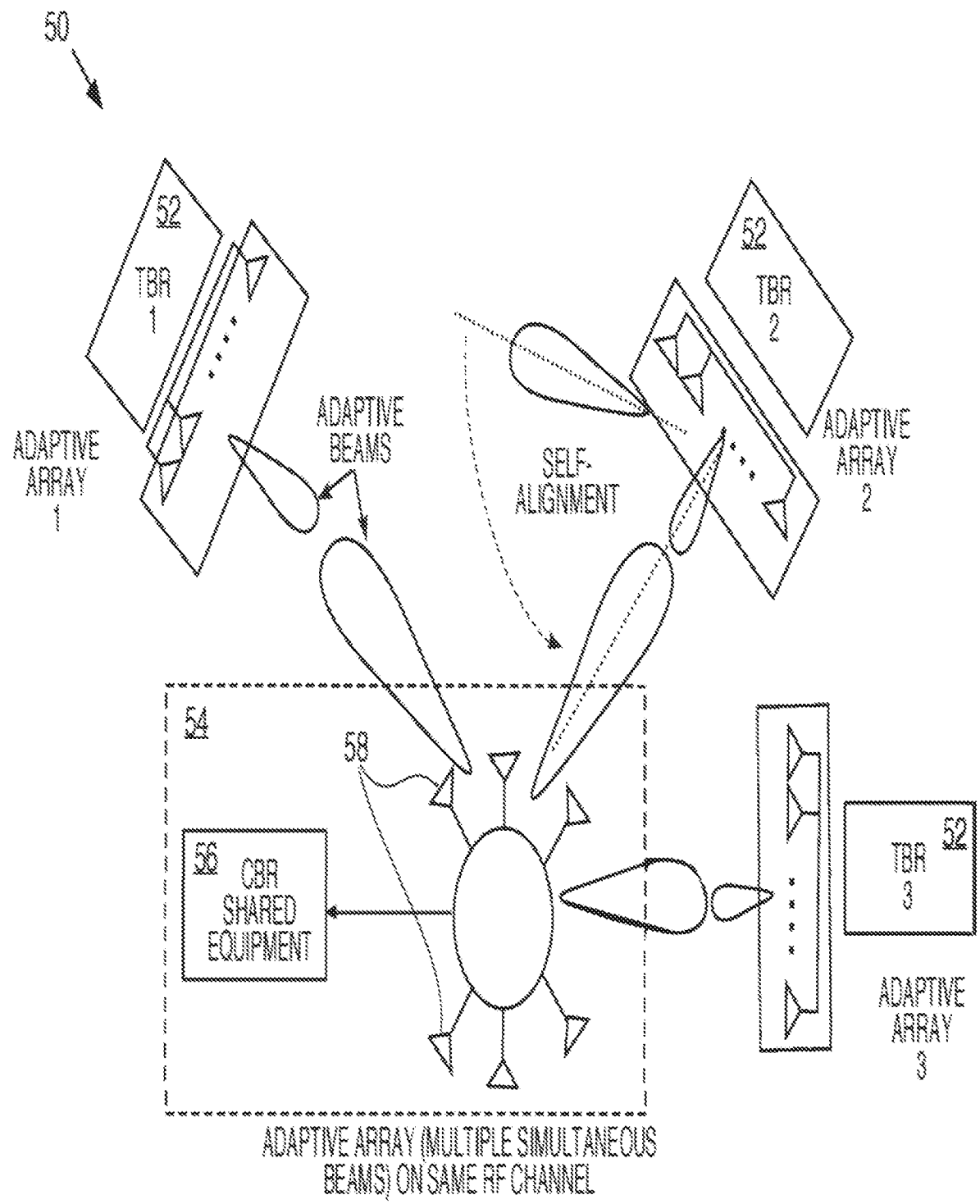
FIG. 18 illustrates an example of an implementation of a non-line of sight communication system.
Figure 19:
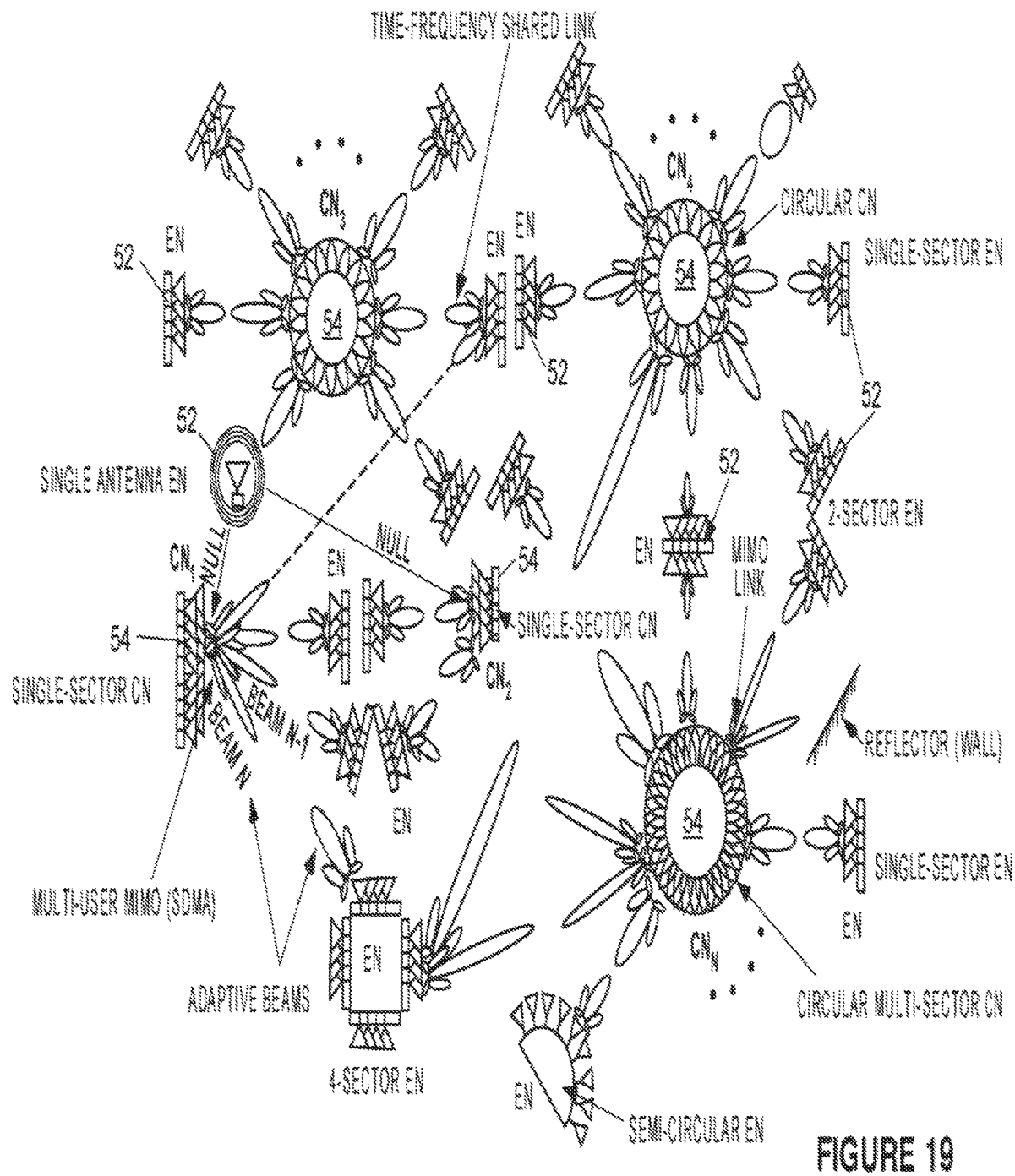
FIG. 19 illustrates an example of another implementation of a non-line of sight communication system.

One example of an implementation of a system that may use the adaptive antenna systems is a wireless non-line of sight backhaul system 50 that is shown in FIG. 18. However, the techniques and systems described below may be used with other adaptive array system and the backhaul system is illustrated and described for illustration purposes only. The system has one or more links (microwave or RF links) terminated at a central backhaul radio 54 (CBR). In one example, the system has M links where M is a number greater than 1. Each link is comprised of a termination backhaul radio 52 (TBR) and 1/Mth of the CBR with a data capacity of Q bps per link where Q is a predetermined number that ranges from 1 to 15 bps. The data capacity measured at the CBR 54 is M*Q bps. Each link is comprised of a shared adaptive array 58 at the CBR 54 and one or more directional antennas 60 at each TBR. Optionally, the antenna at each TBR can be realized with an adaptive array. If each TBR has an adaptive array, then the TBR will self align its antenna pattern to the CBR. This is accomplished by computing the array's beamforming weights using the frame start preamble (FSP) of the CBR as a reference. The weights may be computed from the Weiner equation using the array covariance matrix and the cross-correlation of the data with the FSP. Alternately, known reference symbols in the CBR may be used instead of the FSP as the desired signal. For all TBR antenna types, the CBR will self align its antenna pattern to all of the TBRs. When adaptive arrays are used for both the CBR and TBRs, the CBR and TBR adaptive arrays seek to maximize the signal-to-interference and noise ratio (SINR) by pointing an antenna beam toward the other end of the link, and by reducing interference by directing spatial nulls of the array toward these sources of link degradation.

Figure 3A:
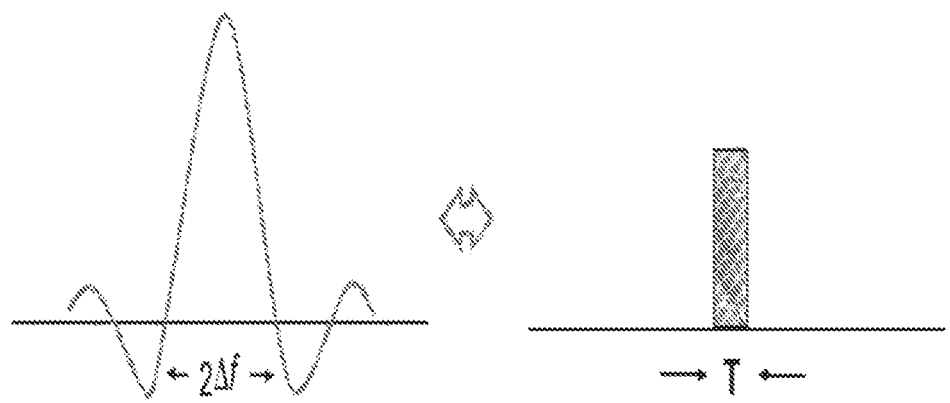
FIGS. 3A and 3B are two examples of a pulse.
Figure 3B:
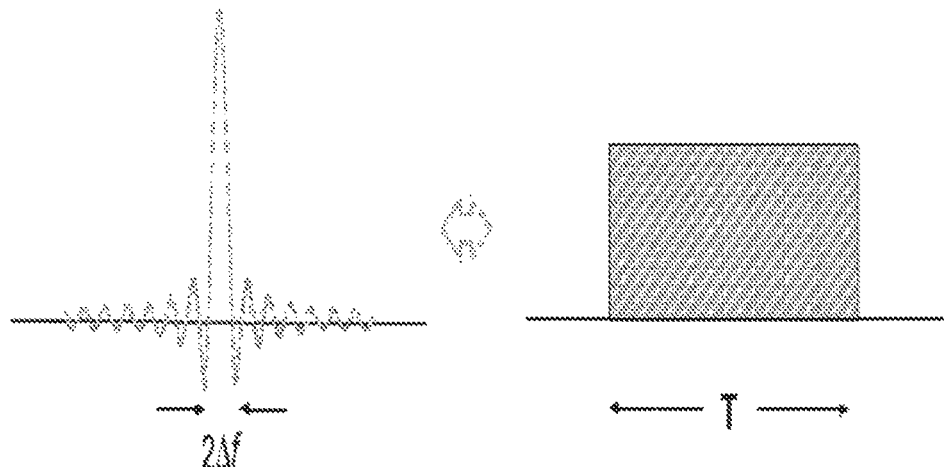

In more detail, the wireless backhaul system 50 may have an architecture as shown in FIG. 3 which there is a central/concentrating backhaul radio (CBR) 54 that is communicating with up to 10 terminating backhaul radios (TBRs) 52 and each of the TBRs may be located adjacent a picocell and provide a connection between the picocell and the network as a backhaul network. In more detail, a wireless backhaul is used to connect wireless base stations to the core network and/or the operator's point-of-presence and facilitates the backhaul connection of all types of base stations, including femto, pico, micro, mini, and macro base stations. Moreover, this same technology is effective in wireless broadband bridging and last mile extensions of copper, cable and fiber plant. The wireless backhaul system described herein is able to handle the capacity requirements of 3G systems, 4G systems and future wireless protocols (including wireless data protocols.)

The CBR 54 may further comprise an adaptive antenna array 58 (that permit multiple simultaneous beams of the same channel) and a piece of CBR shared equipment 56. The CBR 54 can handle multiple simultaneous beams using the same channel because the system is able to perform extreme interference cancellation to eliminate interference between the various TBR signals. In this invention, this is accomplished by directing spatial nulls in the array antenna pattern in the directions of all interfering TBR while forming a beam peak in the direction of the desired TBR. Moreover, this process is replicated for each desired TBR connected to the CBR thus forming multiple beams and mutual spatial nulling that cancels interference. In conventional PtMP systems, the CBR-like hub can usually handle multiple beams, but those beams each use separate RF channels which wastes bandwidth.

While the maximum SINR optimization criterion is described above, other criteria also may be used (e.g. max SIR beamforming or non-linear data direction beamforming). Of particular importance is an extreme interference cancellation (EIC) feature at each TBR 52 if a high order (6 to 256 elements) adaptive array is employed at the TBR 52 using the equations (E1) through (E23) and equation G1 described below. This feature enables a boost in the SINR from 10 dB to 25 dB nominally in typical system deployments. In addition, depending on the coding rate, EIC is projected to boost link capacity from 1-2 bps/Hz to over 5-6 bps/Hz. Furthermore, if dual polarizations are used, then the capacity can be increased by a factor of 2 (maximum).

Multi-target beamforming introduces a unique beam and interference nulling solution for each TBR 52. Thus, the CBR 54 issues M beams, one each to M TBRs. Each of these beams may use one of M separate frequency channels, or one of M separate subchannels within the overall channel. Alternately, the beams may use the same frequency channel. In the case in which the beams use the same frequency channel, the adaptive array eliminates the interference from the M−1 other beams using spatial nulling techniques. Alternately, the beams may use a combination of M/K channels or subchannels where K is integer sub-multiple of M. In this case, the adaptive array eliminates the interference from the M/K−1 other beams using spatial nulling techniques. The non-line-of-sight backhaul operation involves angle and delay spread array processing to remove the effects of frequency selective channel responses due to multipath. This process is described using the channel model described in Equation (B1) through (B2) Moreover, it deals with multiple copies of the signal arriving from Q disparate angles of arrival. Conceptually, this involves creating a separate beamforming/null steering solution for each of Q signal paths at each delay spread value, then adaptive combining the Q outputs of the individual paths to optimize the SINR of the link. Two-dimensional beamforming in space for each time-delayed multipath is used. This may be implemented as a tapped delay line beamformer. Alternately, the beamforming operations may be realized efficiently by transforming the array signals between the frequency and time domains.

For the case of dual polarization, the 2 dimensional beamformer can operate on 2M antennas where M in the number of antennas with one polarization. Many algorithms as described above yield an optimal solution to this problem if all antennas/polarizations are used in the formulation.

FIG. 19 illustrates an example of another implementation of a non-line of sight communication system 50 that has a plurality of concentrating nodes (CNs) and a plurality of end nodes (ENs) that communicate with each other as described above in FIG. 18 and as further described in co-pending patents applications Ser. Nos. 13/445,861, 13/445,863 and 14/445,869, all filed on Apr. 12, 2012, the entirety of all of which are incorporated herein by reference. In the implementation of the system in FIG. 19, the CNs 54 may be circular, multi-section CNs (such as CN3. CN4. CNN as shown in FIG. 19) with a plurality of antennas and a single sector CN with a single set of antennas. The ENs 52 may be a four sector EN with antennas on each side of the EN, a two sector EN with two sets of antennas offset from each other by a predetermined angle, a MIMO link EN, a single section EN, a single antenna EN and a semi-circular EN. The ENs and CNs shown in FIG. 19 may communicate in the same manner as described above in FIG. 18 and also as described below in more detail.

Figure 20:
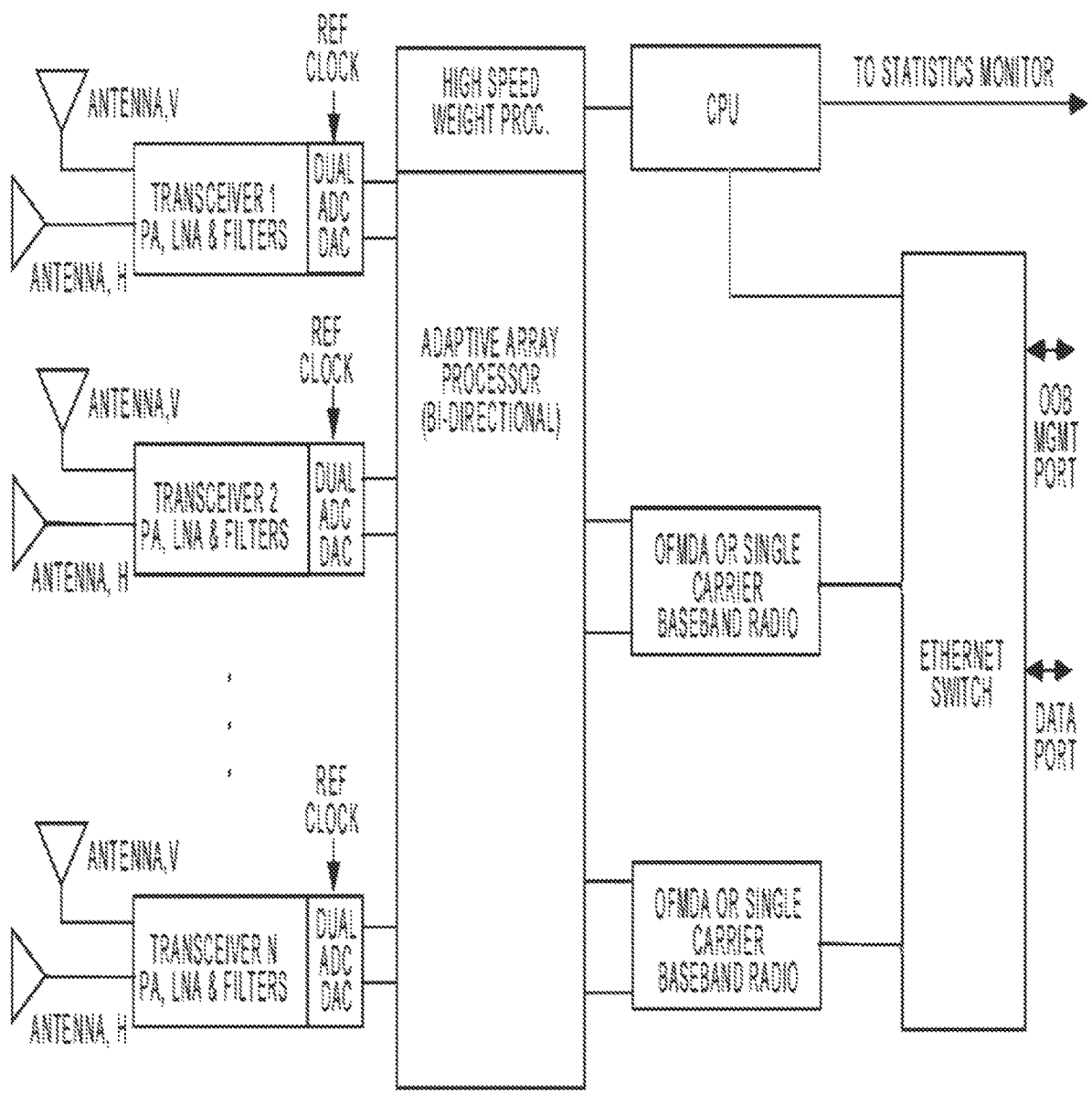
FIG. 20 illustrates an example of a precision array processing radio system using a semi-coherent transceivers subsystem.
Figure 21:
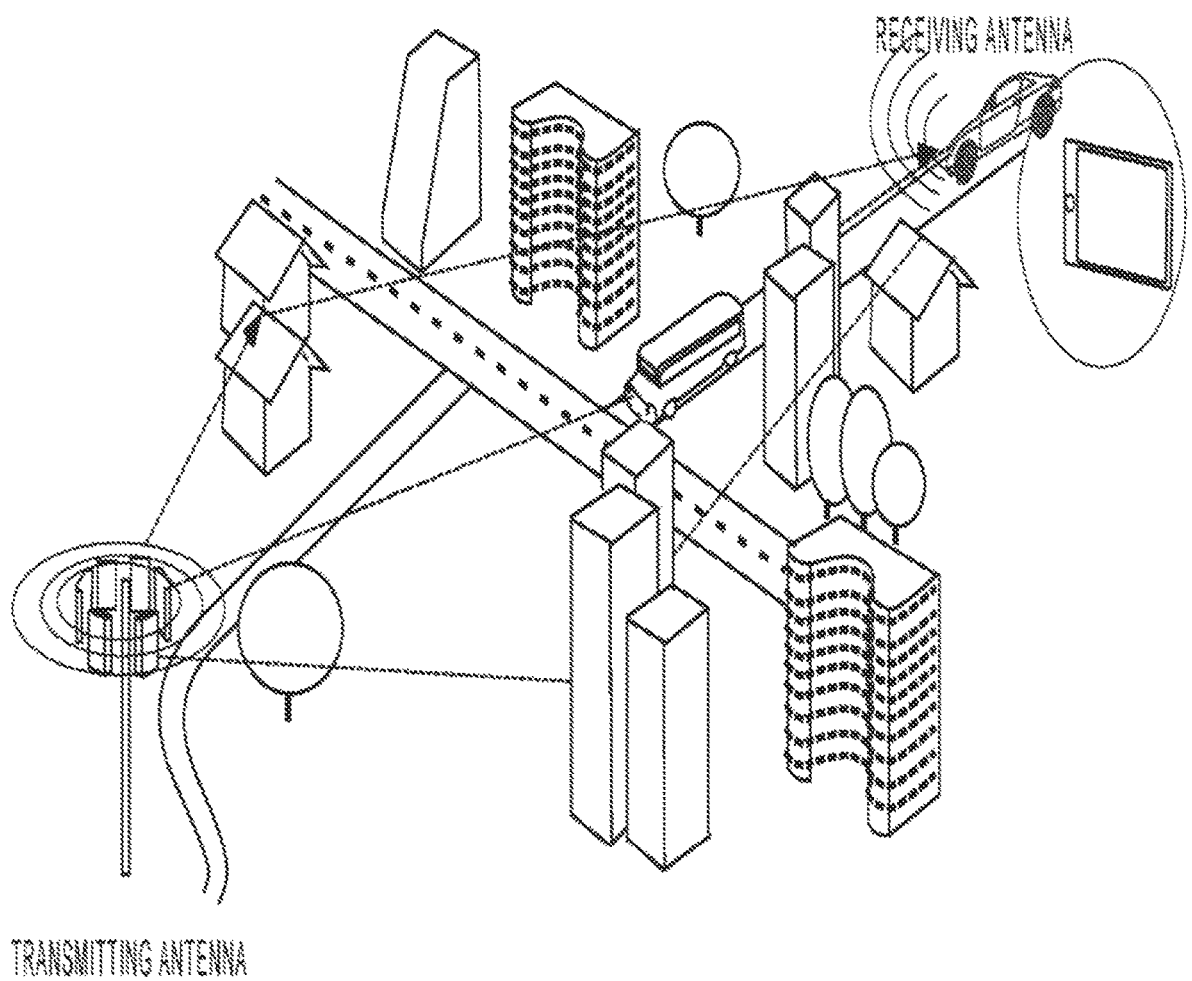
FIG. 21 illustrates an example of a real-world implementation of the non-line of sight communication system.

An example of an adaptive array radio system that is used at the CN is illustrated in FIG. 20. It is comprised of an semi-coherent RF transceiver subsystem, adaptive array processing subsystem implemented via Kcn baseband dual channel radios, 2Kcn antennas, control CPU and Ethernet switch, herein called a CN adaptive array radio system. The EN uses a similar architecture using Kcn baseband dual channel radios, 2Kcn antennas, control CPU and Ethernet switch, herein called a EN adaptive array radio system. The embodiment of the inventions describe herein apply to the system layout of FIGS. 18 and 19 and to the adaptive array radios systems of FIG. 20. Various architectures and methods are described to enhance the capacity and performance characteristics of the system. FIG. 21 illustrates an exemplary real world implementation of the adaptive array radio system.

System Performance

For measuring the overall performance of the network, there are several metrics of interest. The most important of these metrics is the capacity density or capacity per unit area. Since the network can be heterogeneous, the capacity density will likely not be uniform. Therefore, it is more appropriate to refer to it as the average capacity density. The average capacity per unit area $\overline{\rho}_c$ equals the product of $\overline{\rho}_{CN}$, the CN density average number of CNs per unit area (i.e. spatial reuse) and $\overline{C}_{CN}$, the average maximum capacity of a CN (i.e. spatial multiplexing).

$$\overline{\rho}_c = \overline{\rho}_{CN}\overline{C}_{CN} \quad (1)$$

The units for $\overline{\rho}_c$ is bits/sec/m2 or b/s/m2, 1/m2 for $\overline{\rho}_{CN}$, and b/s for $\overline{C}_{CN}$. In general, increasing the number of CNs per unit area will only cause the maximum achievable capacity of a CN to drop due to higher interference. However, increasing the number of adaptive antennas on the CNs and the ENs improves both $\overline{N}_{CN}$ and $\overline{C}_{CN}$. The capacity of a CN, $\overline{C}_{CN}$, is product of $N_{stream}$, the number of independent simultaneous spatial streams that can be supported by the CN, and $C_{stream}$, the average capacity per stream:

$$\overline{C}_{CN} = \overline{N}_{stream}\overline{C}_{stream} \quad (2)$$

Both $\overline{C}_{CN}$ and $\overline{C}_{stream}$ are in b/s, and $\overline{N}_{stream}$ is unitless. The average number of streams that can be supported per CN increases when required capacity per stream is reduced. The average number of streams also increases by increasing the number of antennas on the ENs and CNs. The average capacity per stream is a product of the Shannon Capacity W log 2(1+SINR) and the communication efficiency ξ:

$$\overline{C}_{stream} = \xi W \log 2(1+SINR) \approx \xi W \log 2SINR, \ 0 \leq \xi \leq 1 \quad (3)$$

where W is the signal bandwidth in Hz, SINR is the signal to noise and interference ratio and is unitless, and the communication ξ is a unitless quantity that represents the information content of the stream or the ratio of the useful bits or symbols transmitted to the total number of bits or symbols transmitted. Useful bits are ones that carry actual data as opposed to communication overhead that may include bits used for link and network management, training, synchronization, redundancy and error recovery etc. For the purpose of this document, the communication overhead shall only include PHY and MAC layer overheads. It is possible to write the communication efficiency in terms of the overhead ϵ:

$$\xi = 1-\epsilon, \ 0 \leq \epsilon \leq 1 \quad (4)$$

The SINR is the signal to noise and interference ratio:

$$SINR = \frac{\sigma_s^2}{\sigma_n^2 + \sigma_I^2} \quad (5)$$

where $\sigma_s^2$, $\sigma_n^2$ and $\sigma_I^2$ are the signal, noise, and interference powers respectively (measured in Watts) Noise is a combination of many different sources (e.g. background, thermal, quantization, phase noise), and is usually additive. Interference is a combination of managed and unmanaged interference. The managed interference comes from within the network. Unmanaged interference comes from outside the network, either in unlicensed bands or through out of band spectral leakage. In most practical systems, distortion and intermodulation products also affect the signal integrity. The base 2 logarithm of the SINR has units of bits (b).

Increasing the number of antennas on either CN or the EN improves the SINR by canceling more interference and increasing the signal gain. However, more antennas also require more training and thus more overhead, which is discussed in detail below.

The capacity density of the network may be written as:

$$\overline{\rho}_c = (1-\epsilon)W\overline{N}_{stream} \log_2 \overline{SINR} \quad (6)$$

wherein a bar indicates an average value, If both sides of (6) are divided by W, an average spectral efficiency per unit area is:

$$\frac{\bar{P}_c}{W} = (1-\varepsilon)W\bar{N}_{stream}\log_2\overline{SINR} \quad (7)$$

The average spectral efficiency per unit area, $$\frac{\bar{P}_c}{W}$$

is the quantity we seek to maximize, subject to some constraints such as the number of antennas or the power requirements per CN or EN.

$$\frac{\bar{P}_c}{W}$$

has units of b/s/Hz/m2.

It can be assumed that the different nodes process data independently, and do not cooperate. In theory, the CNs can collaborate by sending all their data to a central location for processing. They can do that over the wired network. The joint/collaborative processing is clearly superior to independent processing. However, it is not feasible in practice for several reasons. First, the communication overhead required for joint processing is very large. Second, joint processing requires very tight time/frequency synchronization across the network. Finally, the latency required to produce the actual data at the centralized locations may be unacceptable for some real-time applications or may not be sufficient to track fast variations in the channel and network dynamics.

Signal and Frame Structure

Channel Duplexing

Figure 1B:
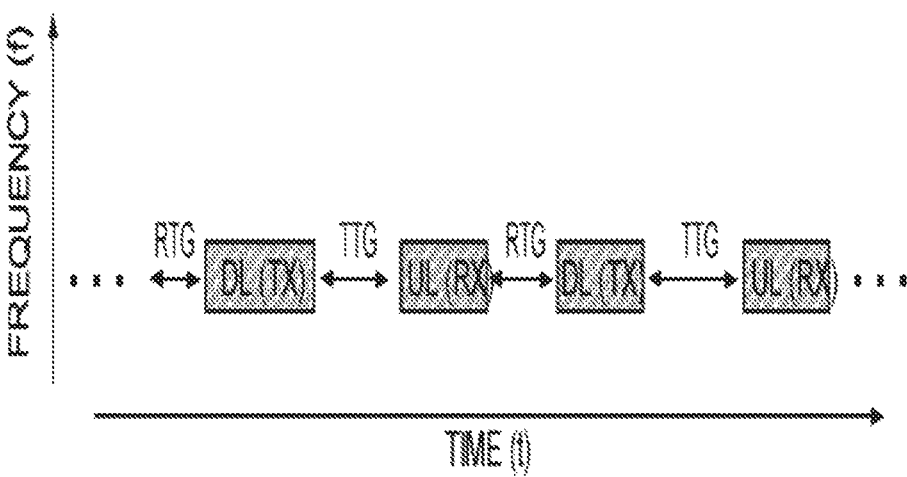

A wireless link is composed of an downlink (DL) and uplink (UL). The DL refers to the traffic flowing from the CN to the EN, and the UL refers to the traffic flowing from the EN to the CN. The UL is sometimes referred to as the reverse link. The DL and the UL are usually split in either time or frequency. The allocation of time/frequency resources between the DL and UL is called duplexing. If the DL and UL are split in time, then the system is called a time-division duplexing (or TDD) system, and if they are split in frequency, then the system called a frequency-division duplexing (or FDD) system. FIGS. 1A and 1B shows the general structure of FFD and TDD links, respectively. Guard times (bands) are inserted between the DL and UL in TDD (FDD) systems in order to reduce the DL/UL cross-leakage. The properties of TDD and FDD systems are discussed in more detail below. The data rate on the DL and UL need not be the same since the radio hardware and signal processing on both ends of the link may not be the same.

Framing

Data is transmitted over a link in small units called frames. TX-RX pairs use the beginning of each frame to re-establish time-frequency lock. The frame length is chosen short enough so that the clock drift at both ends of the link by the end of the frame is within a tolerable range, and the network and channel conditions do not change much over the duration of the frame. However, if the frame is too short, then the overhead increases.

Symbol Structure

Figure 2A:
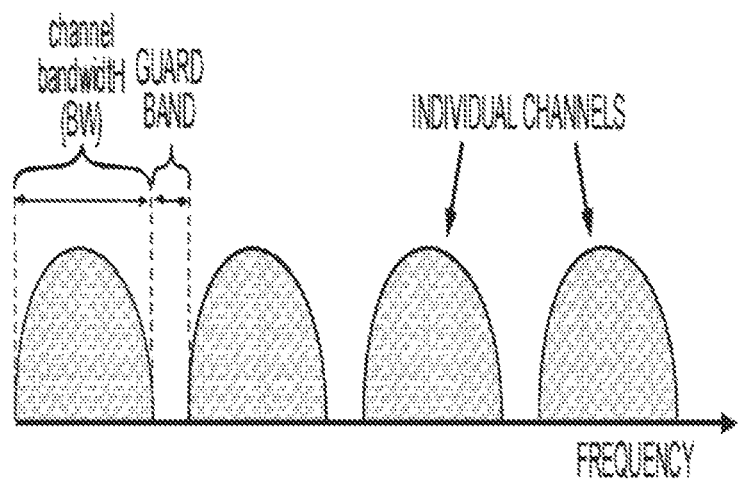
FIGS. 2A and 2B illustrate a first and second method for constructing a symbol from multiple carriers, respectively.

Frames (or subframes) are further divided into symbols. The symbol length is inversely proportional to the bandwidth W. A symbol can be composed of a group of smaller parallel subsymbols. The length of the symbol is proportional to the number of subsymbols. A simple way to divide a large symbol into smaller subsymbols is to stack multiple narrow band channels in parallel as shown in FIG. 2a. However, this method of packing subchannels is not very efficient since these subchannels cannot overlap. In order to ensure that they do not overlap, some amount of guard band needs to be inserted between those subbands in order to allow an adequate transition for the bandpass filters. The size of the band guard is proportional to the size of the subchannel. As a result, the extra overhead is independent of the number of subchannels. There are techniques that use filter banks and polyphase filters (e.g. Filter Bank Multi-carrier or FBMC) that significantly improve the subband-packing efficiency. These methods, however, come with additional overhead in computation.

Figure 2B:
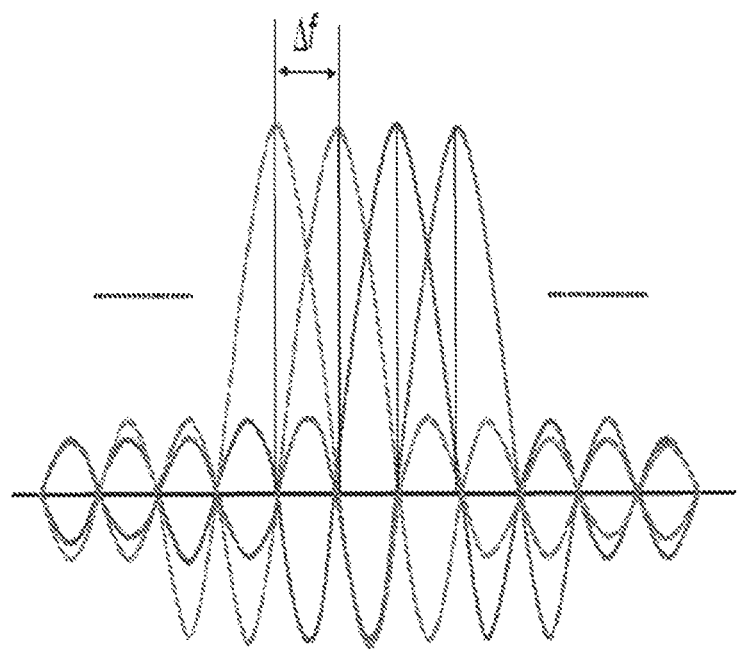

A more efficient way to pack multiple carriers is using orthogonal frequency division multiplexing (OFDM). Under OFDM, data is encoded into the subcarriers in the frequency domain and converted via IDFT (IFFT) into a single time domain stream to be transmitted. The data is then recovered at the receiver by converting the signal back to the frequency domain via FFT and extracting the symbols from the subcarriers. OFDM is a more efficient scheme since the subcarriers overlap with each other as shown FIG. 2b. The trick is that every subcarrier has a shape of a sinc function, and each subcarrier has a zero (null) where other subcarriers peak. Tight synchronization and low phase noise are required to ensure that those nulls don't move around too much. If N is the total number of subcarriers, then the length of the OFDM symbol is $\tau_s = N/W$. The length of the symbol is proportional to N is the length of a subcarrier is inversely proportional to its bandwidth, which is inversely proportional to N as shown in FIG. 3. Note that the amount of information carried per unit time is independent of N, and is proportional to W.

The methods described in this disclosure are independent of the symbol structure and modulation, and apply equally to OFDM and FBMC, which also include the special case of a single carrier signal.

Intersymbol Interference

Figure 4:
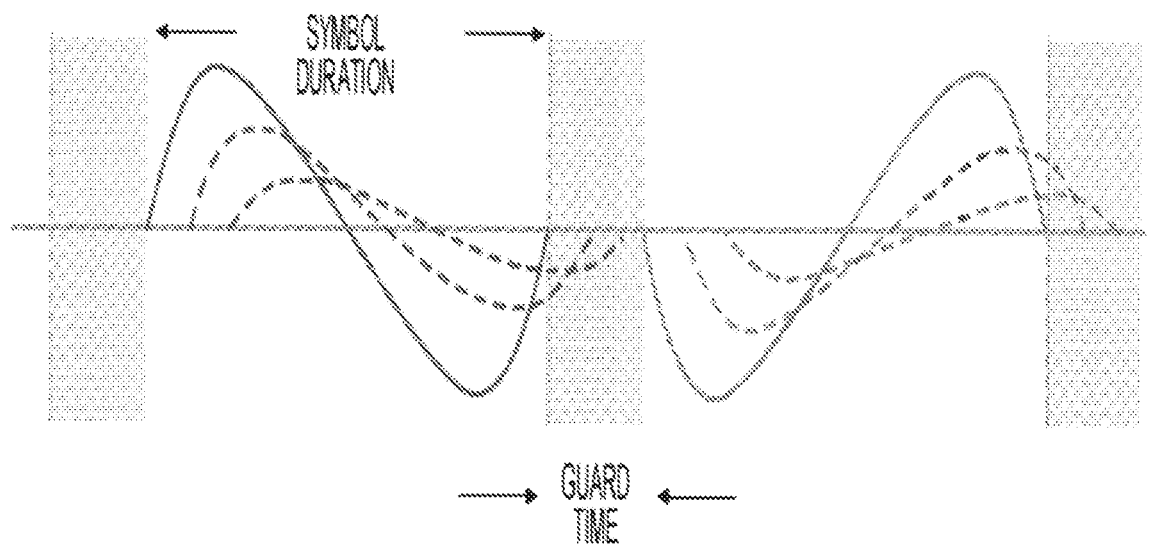
FIG. 4 illustrates an example of a time guard.
Figure 5A:
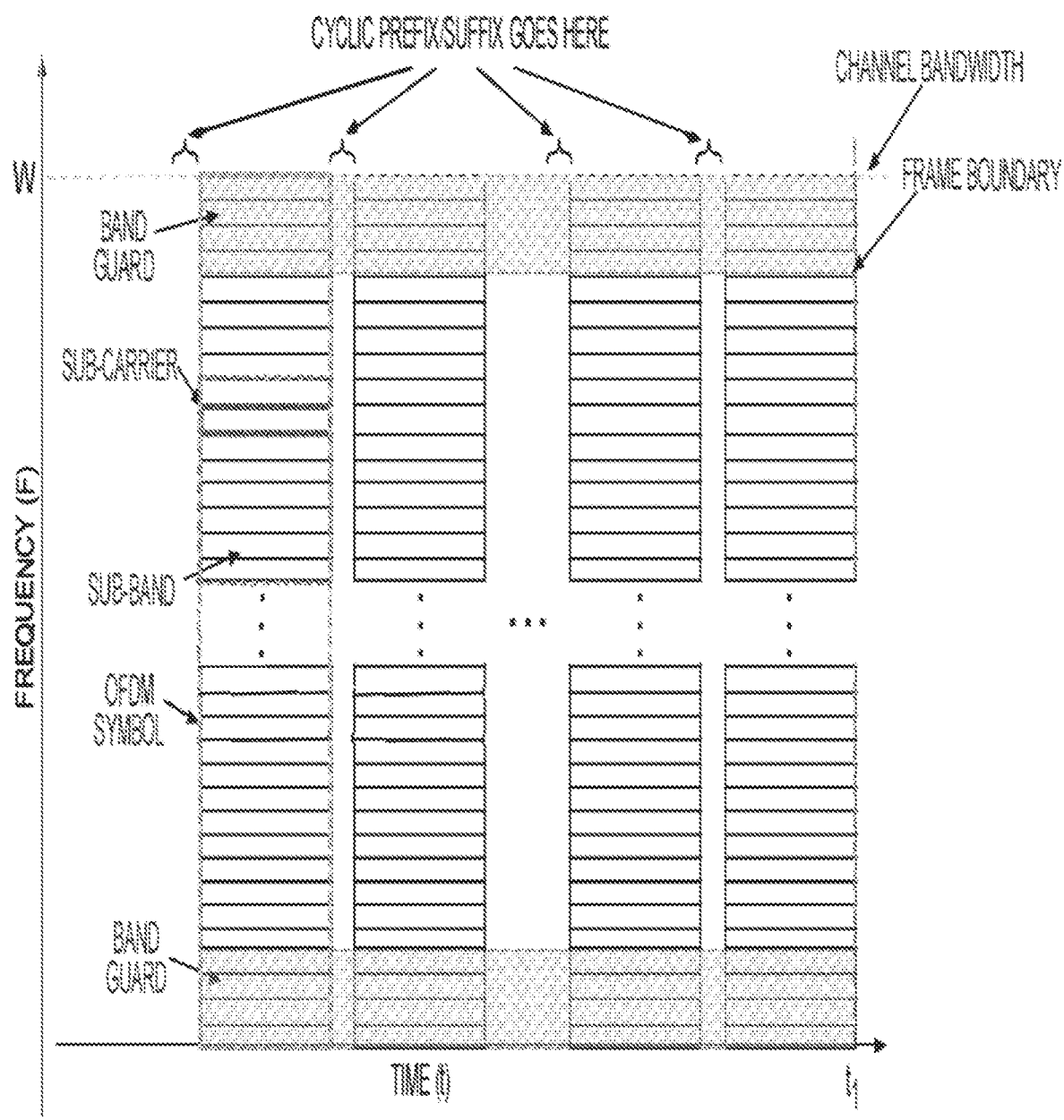
FIGS. 5A and 5B illustrate OFDM symbols.
Figure 5B:
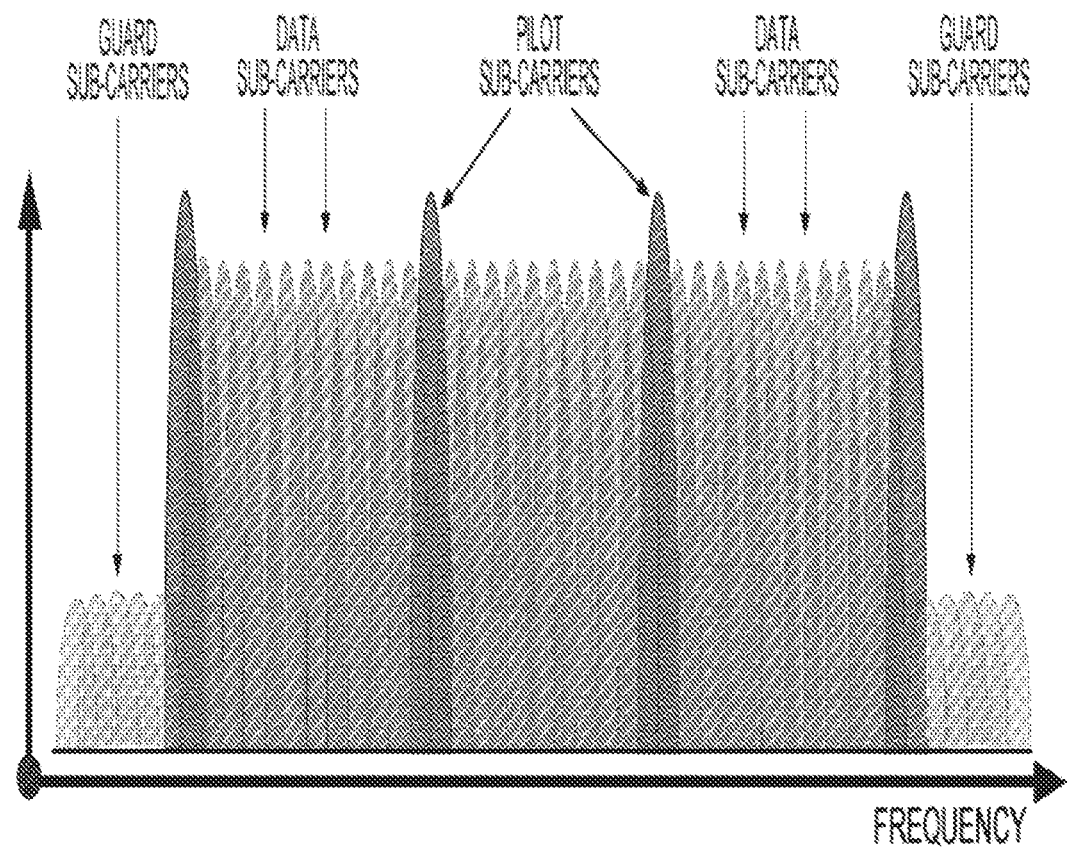

Recently, most high bandwidth cellular communication systems and wireless local area networks (WLANs) have been shifting towards OFDM technology. The main drivers of this shift are ISI and data multiplexing. As W becomes larger, the ratio of the delay spread $\tau d$ to sample (symbol) time 1/W also becomes large, which leads to delayed copies of a sample that will interfere with subsequent samples, a phenomenon known as intersymbol interference (ISI.) The extent of the ISI is represented by the number of taps in the channel response, which is proportional to $\tau_d W$. The most conventional technique for combating ISI is linear equalization. With linear equalization, an MMSE adaptive filter (e.g. LMS) is employed to flatten the channel response. The complexity of these algorithms becomes unacceptable as W increases. In order to avoid linear equalization, a guard time $\tau_g > \tau_d$ is attached before (prefix) or after (suffix) each symbol as shown in FIG. 4. Since the guard is chosen to be larger than the delay spread of the channel, no ISI takes place. The price paid is the form of the extra overhead from the guard time. However, this makes the effective length of the symbol $\tau_s + \tau_g$. The extra overhead is represented by the ratio of guard time to the symbol length $\tau_s/\tau_g$. Therefore, when $\tau_s$ is small, the overhead becomes significant. The only way to increase the symbol time without reducing the bandwidth is by increasing the number of subcarriers, and hence the shift towards OFDM. The multitap channel response in the time domain results in a frequency selective response in the frequency domain. For an OFDM symbol, this means that the amplitude and phase response may differ from one subcarrier to the next. In this case, the equalization process simply constitutes measuring the channel response at each subcarrier, and then adjusting its phase and amplitude (multiplying it by a complex scalar) so that the response becomes flat across all subcarriers. This frequency domain equalizer is much easier to implement than a conventional linear MMSE equalization.

The ratio $\tau_g/\tau_s$ can be made arbitrarily small by increasing the number of subcarriers N. However, there are limits to how large N can be, not withstanding processing limitations. First, when the symbol becomes very long, so does the link latency, which cannot grow without bounds. Second, when multiple subcarriers (sub-channels) are added together in the time domain, the resulting signal (waveform) will have a time-varying amplitude, even if the original signals may have constant amplitude. The peak to average power ratio (PAPR) of this time-domain waveform increases with $N^{1/2}$. A high PAPR places more stringent constraints on the linearity and dynamic range of both the transmitters and receivers. Finally, when N is large, the subcarriers become very closely packed, and if the intercarrier spacing $\Delta f=W/N$ is close to or smaller than the Doppler spread of the channel $D_s$, then the locations of the different subcarriers will shift relative to one another, and signal will be susceptible to intercarrier interference (ICI)

Cyclic Prefix and Suffix

In most practical OFDM implementations, the guard time slot between symbols is not empty; instead, a fraction of the symbol either from the beginning or the end is copied into the slot. Either a fraction from the start of the symbol is copied into guard slot following the symbol, which is known as a cyclic suffix (CS), or a fraction from the end of the symbol is copied into the guard slot preceding the symbol, which is known as a cyclic prefix (CP). Under this approach, the receiver must first strip the CS (or CP) before processing the symbol (i.e. transforming into the frequency domain etc.). The advantage of this approach compared to leaving the guard time blank is that it adds more redundancy to the symbol and makes it more robust to timing errors.

Multiple Access

In systems where channel resources must by divided among different users, one or more of the following techniques is used. Time division multiplexing (multiple access) divides the channel resources in time (i.e. each user is assigned a unique time slot), frequency division multiplexing (multiple access) divides the channel resources in frequency (i.e. each user is assigned a unique subband or group of subbands), code division multiplexing (multiple access) assigns different users orthogonal codes, and spatial multiplexing (multiple access) assigns each user a unique beam. Sometimes, the term statistical multiplexing is used to imply that channel resource allocations are not fixed, but based on traffic demand.

Frame Control Data

Each frame component (both DL and UL) contains two parts: a frame header and the payload. The header contains control information necessary to establish the link. The payload contains the actual data to be transported. The control information include the following:

Frame start preamble: first symbol in the frame, which indicates the start of the frame. The preamble is usually used for time and frequency synchronization. The structure of the preamble is usually agreed upon apriori between the two ends of the link. The preamble is only part of the DL, since the EN derives its timing and frequency from the CN.

Training symbols: used for training the space-time beamforming weights. These symbols are also known apriori at both ends of the link, and occur on both the DL and UL. The training symbols are usually chosen such that they are orthogonal (or uncorrelated) for different links.

Pilots: used for channel estimation and equalization. Like training symbols, pilots are also known apriori at both ends of the link, and occur on both the DL and UL. Pilots are usually spread out evenly through they frame in order to allow tracking of small amounts of channel variations and frequency drift.

Maps: contain frame control information such as frame length, channel allocation, signal modulation level, length of the cyclic prefix and power control. Unlike the preamble/training/pilots, the information contained in the map can vary from frame to frame depending on the channel conditions.

The slots in the time-frequency grid which are occupied by the header and the payload are pre-defined in the physical layer specification. The header may contain some dummy slots, whose values are controlled by the transmitter in order to reduce the PAPR. These slots are discarded at the receiver end. In addition to the header, a fixed number of subcarriers at both ends of the band are zeroed out in order minimize the amount of spectral leakage. These subcarriers are referred as the guard subcarriers or the guard band. Also, to reduce the leakage from one symbol into the next (i.e. intersymbol interference or ISI), a guard time is added between symbols. The aggregate of these is the overhead.

Spatial Multiplexing and Interference Mitigation

The system may implement spatial multiplexing and interference mitigation using space time adaptive processing (STAP.) An estimate $\hat{d}(n)$ of the original signal $d(n)$ can be realized by processing the received data with a 2-dimensional filter in the dimensions of space and time, hence a space-time adaptive processor (STAP). This filter may be written as the linear convolution of receive vector $x(n)$ at time n with the $K_1+K_2+1$ time taps of the filter where each time tap has coefficients $w^H(k)$ for $-K_1 \leq k \leq K_2$:

$$w^H(n) * x(n) \equiv \hat{d}(n) \tag{C1}$$

$$w^H(n) * x(n) \equiv \sum_{k=-K_2}^{K_3} w^H(k)x(n-k) \tag{C2}$$

$$w(n) \equiv \left[w^H(K_1), w^H(K_1-1), \ldots, w^H(-K_2)\right]^H \tag{C3}$$

The error between the output of the STAP filter $\hat{d}(n)$ and the desired signal $d(n)$ can be expressed as $\varepsilon(n)$. We seek to minimize the expected value of the error power $\mu$ where we replace the expectation with a time average over a suitably large interval over the time index n.

$$\varepsilon(n) = \hat{d}(n) - d(n) \tag{C4}$$

$$\mu = \langle |\varepsilon(n)|^2 \rangle_n \tag{C5}$$

$$\varepsilon(n) \equiv \sum_{k=-K_2}^{K_2} w^H(k)x(n-k) - \hat{d}(n) \tag{C6}$$

$$\varepsilon*(n) \equiv \sum_{k'=-K_2}^{K_2} x^H(n-k')w(k') - \hat{d}*(n) \tag{C7}$$

where the estimate of the signal and the signal conjugate is written as follows:

$$\hat{d}*(n) \equiv \sum_{k'=-K_2}^{K_2} x^H(n-k')w(k') \quad \text{(C8)}$$

$$\hat{d}(n) \equiv \sum_{k=-K_2}^{K_2} w^H(k)x(n-k) \quad \text{(C9)}$$

The time averaged error power can be written as follows:

$$\mu = \left\langle \sum_{k=-K_2}^{K_2} w^H(k)x(n-k) \sum_{k'=-K_2}^{K_2} x^H(n-k')w(k') - \right.$$
$$\hat{d}*(n) \sum_{k=-K_2}^{K_2} w^H(k)x(n-k) +$$
$$\left. \hat{d}^2(n) - \hat{d}(n) \sum_{k'=-K_2}^{K_2} x^H(n-k')w(k') \right\rangle_n \quad \text{(C10)}$$

Since the system would like to minimize the error power as a function of the tap weights to minimize the mean squared error, the partial differentials with respect to the tap weights can be taken as follows:

$$x(n-k)x^H(n-k')(w(k')) = 2\sum_{k'=-K_1}^{K_2} R_{xx}(-k,k')w(k') \text{ for } j=k, \quad \text{(C11)}$$
otherwise 0

$$\frac{\delta\mu}{\delta w^H(j)} = \hat{d}*(n)\sum_{k=-K_2}^{K_2} w^H(k)x(n-k) = \quad \text{(C12)}$$
$$2\hat{d}*(n)\sum_{k=-K_1}^{K_2} x(n-k) \text{ for } j=k, \text{ otherwise } 0$$

$$\frac{\delta\mu}{\delta w^H(j)} = \hat{d}(n)\sum_{k=-K_1}^{K_2} x^H(n-k')w(k') = 0 \quad \text{(C13)}$$

$$\frac{\delta\mu}{\delta w^H(j)} = \hat{d}^2(n) = 0 \quad \text{(C14)}$$

Hence, the equations can be rewritten as follows:

$$\frac{\delta\mu}{\delta w^H(j)} = 2\sum_{k'=-K_1}^{K_2} R_{xx}(k'_s-k)w(k') - 2r_{xd}(-k) \quad \text{(C15)}$$

where the following expressions are defined:

$$r_{xd}(-k) \equiv \langle x(n-k)d*(n) \rangle_n \quad \text{(C16)}$$

$$R_{xx}(k',-k) \equiv R_{xx}(k'-k) \equiv \langle x(n-k)x^H(n-k') \rangle_n \quad \text{(C17)}$$

Setting the partial derivatives to zero for each weight vector, the essential equations can be rewritten as:

$$\sum_{k'=-K_1}^{K_2} R_{xx}(k',-k)w(k') = r_{xd}(-k) \text{ for } -K_1 \leq k \leq K_2. \quad \text{(C18)}$$

The above equation can be rewritten in matrix form as:

$$R_{xx}W = R_{xd} \quad \text{(C19)}$$

where $$W \equiv [w^H(-K_1), w^H(-K_1+1), \ldots, w^H(K_2)]^H \quad \text{(C20)}$$

$$R_{xd}(n) \equiv [r_{xd}^H(K_1), r_{xd}^H(K_1-1), \ldots, r_{xd}^H(-K_2)]^H \quad \text{(C21)}$$

$$R_{xx} = \begin{bmatrix} R_{xx}(0) & \ldots & R_{xx}(-K_1-K_2) \\ \vdots & \ddots & \vdots \\ R_{xx}(K_1+K_2) & \ldots & R_{xx}(0) \end{bmatrix} \quad \text{(C22)}$$

If the above matrix equation is rewritten in summation form, the equation becomes:

$$\sum_{k=-K_1}^{K_2} R_{xx}(k'+k)W(k') = R_{xd}(k) \quad \text{(C23)}$$

Further details of STAP are disclosed in more detail in co-pending patent application Ser. No. 13/445,861, 13/445,863 and 14/445,869, all filed on Apr. 12, 2012, the entirety of all of which are incorporated herein by reference.

In this section, a bold lower case letter is used to denote vectors (e.g. v), a bold upper case letter is used for matrices (e.g. H), and standard font letters are used for scalars.

The LMS update equations can be derived by following the definition of gradient descent:

$$\varepsilon[n] = E[|e[n]|^2] = E[|s(n) - w^T[n] \times [n]|^2] \text{(error criterion at time/sample } n) \quad (8)$$

where $\varepsilon[n]$ is the error criterion (i.e. mean squared error, non-negative real scalar) to be minimized at sample time n, e[n] is the error (complex scalar) at sample time n, s[n] is the desired signal (complex scalar) at sample time n, w represents the filter taps (complex column vector of length K) at sample time n to be adapted, and $x[n] = [x[n-K+1], x[n-K+2] \ldots x[n]]^T$ represents the data (complex column vector of length K) at time n. Since the signal statistics are generally unavailable apriori, the expected value in 8 is replaced by the instantaneous value:

$$\varepsilon[n] = |e[n]|^2 = |s(n) - w^T[n] \times [n]|^2$$

$$\Rightarrow \nabla_{w[n]} \varepsilon[n] = -2 \times [n]*(s(n) - w^T[n] \times [n]) = -2e[n] \times [n]^-$$

$$\Rightarrow w[n+1] = w[n] - 2\mu[n]\nabla_{w[n]}\xi[n] = w[n] + \mu[n]e[n]x^-[n] \quad (9)$$

where $\nabla_{w[n]}\varepsilon[n]$ is the gradient of the error criterion with respect to the filter coefficients, $\mu[n]$ is the LMS update step size (a positive real scalar) at time sample n (the factor 2 was absorbed in the value of $\mu[n]$)

The accuracy and speed of convergence of the LMS algorithm depends on the step size u and the statistics of input data x. In order to guarantee convergence, the following condition must hold:

$$0 < \mu < 2/\lambda\text{max} \quad (10)$$

where $\lambda$max is the largest eigenvalue of $R_{xx} = EXX^H]$. However, since the statistics of x are not apriori, the trace of $\overline{R}_{xx} = XX^H$ can be used as an upper bound for the largest eigenvalue:

$$0 < \mu < \left\{ \frac{2}{tr\{\overline{R}xx\}} \right\} \quad (11)$$

The convergence time $\tau_{LMS}$ is a function of u:

$$\tau_{LMS} \sim (1/\mu)(\lambda_{max}/\lambda_{min}) \qquad (12)$$

Therefore, the convergence time of LMS depends on both the step size and the eigenvalue of spread (i.e. condition number) of Rxx. In addition to the slow convergence, LMS and other gradient descent algorithms also have some residual error, which results in some misadjustment in the weight vectors. The residual (excess) error is defined as the amount error in addition to the MMSE (the square magnitude of the error vector associated with the Wiener-Hopf solution (approximated with the least squares solution) as n→∞. If we let J [n] be the magnitude of the square error at time n, then:

$$J[\infty] = J_{min} + \mu J_{min} \sum_{i=1}^{K} \frac{\lambda_i}{2 - \mu \lambda_i} = \approx J_{min} + \frac{\mu J_{min}}{2} \sum_{i=1}^{K} \lambda_i = J_{min} + J_{ex}[\infty]$$

where Jmin is the MMSE, and $J_{ex}[n]$ is the excess error at time n.

$$\Rightarrow \overline{J}_{ex}[\infty] = \frac{J_{ex}[\infty]}{J_{min}} = \frac{\mu}{2} \sum_{i=1}^{K} \lambda_i \qquad (13)$$

Therefore, the LMS excess error approaches the MMSE as μ→0.

The LMS algorithm may suffer some stability issues when the input data vector x[n] is large, which may result in gradient noise amplification. The normalized-LMS or NLMS algorithm overcomes this problem by dividing the step size μ by the square magnitude of x[n]:

$$\mu_{NLMS}[n] = \qquad (14)$$

$$\frac{\mu}{\epsilon + x^H[n]x[n]} \Rightarrow w_{NLMS}[n+1] \leftarrow w_{NLMS}[n] + \mu_{NLMS}[n]e[n]x^*[n]$$

A quick examination of Equations 8 and 14 reveals that K complex multiplications and 2K complex additions are required to compute e[n], K complex multiplications and K complex additions are required to compute $\mu_{NLMS}[n]$, 2 real multiplications are required to compute $\mu_{NLMS}[n]e[n]$ (since $\mu_{NLMS}[n]$ is real), K complex multiplications and K complex additions are required to compute $w_{NLMS}[n+1]$. Therefore, the total number of operations required to perform an NLMS update is roughly 3K complex multiplications and 4K complex additions, a total of 26K=O(K) real operations. This computational simplicity, in addition to the numerical stability is one of the key advantages of the NLMS algorithm.

Time-Bandwidth Product

There are several factors that limit the maximum number of independent streams or the maximum capacity that can be supported by the system. The most important is the total number of beam nulls that can be formed by the ENs and CNs, which depends on the total number of DOFs. In practice, the depth of these nulls is not infinite and is limited by many system-wide impairments such as noise, distortion, and quantization. However, the impact of these factors can be made very small by proper hardware design and good signal processing. Therefore, we can assume that the total number DOFs remains the dominating factor. We can quantify the performance of the system, with maximum attainable SINR per stream as a function of the number of independent (simultaneous) streams (L). We will refer to this quantity as γ(L). The total capacity (in bits/sec/Hz) of the system C(L)=L log 2(1+γ(L)). Clearly, γ has an inverse relationship with L. Therefore. C (L) must have a unique global maximum:

$$C_{max} = \max_{L} L\log_2(1 + \gamma(L)) \qquad (15)$$

$C_{max}$ represents that theoretical limit of the maximum achievable capacity for a given network topology. This limit is only when every node in the network has full knowledge of the channel state information (CSI). In practice, nodes only have access to a noisy estimate of the CSI. That estimate is acquired through training. The longer the training, and the higher the SINR of the training symbols, the closer the STAP processor performance is to the optimum. Let $\overline{\gamma}_M(L)$ be the achieved SINR when the STAP processor has M training symbols (samples) available. Then:

$$\lim_{M \to \infty} \overline{\gamma}_M(L) = \gamma(L) \qquad (16)$$

M is referred to as the time-bandwidth product. The rate at which $\overline{\gamma}_M(L)$ approaches γ(L) depends on the number of available DOFs and the STAP algorithm. For example, for least squares based algorithms (e.g. DMI, RLS, RMGSO), the achievable SINR is approximately within 3 dB of the optimum when M is twice the total number of degrees of freedom (i.e. M=2NK), and within 1.1 dB when M=4NK, and 0.5 dB when M=8NK. We can approximate the misadjustment (i.e. the ratio between maximum achievable SINR (with infinite training) and the maximum achievable SINR with finite training) for least squares based algorithms for any value of M (greater than 3NK/2) with the following formula:

$$\frac{\gamma(L)}{\overline{\gamma}_M(L)} \approx \frac{M}{M - NK}, \text{ for } M > \frac{3}{2}NK \qquad (17)$$

Equation 17 is consistent with Equation 16 in the limit. Gradient descent based algorithms (e.g. LMS) are approximately 10 times slower in practice. This would not be a problem if the wireless channels are static, since whatever overhead incurred from training, no matter how large, can be spread over time. Unfortunately, the channels change over time. The coherence time of the channel tc places an upper limit on the maximum number of training symbols, which we call M*. The maximum achievable SINR becomes:

$$\overline{\gamma}_{M^*}(L)$$

M* is a property of the channel and cannot be changed. The STAP training presents an additional overhead, which can be represented as a fraction α(M) of the total traffic. Given this overhead, the optimization in (15) becomes:

$$C_{max} = \max_{L, M \leq M^*} L(1 - \alpha(M))\log_2(1 + \overline{\gamma}_M(L)) \qquad (18)$$

From Equation (18), it is clear that the coherence time places an upper limit on the maximum achievable capacity. In order to get close to these limits, schemes need to be developed to allow the TBP to approach its upper limit (M*) while minimizing the overhead associated with the training ($\alpha(M)$).

In most practical deployments, CNs are likely to be larger than ENs, and thus will probably contain more spatial DOFs. Furthermore, traffic demand on the DL is also likely to larger than the demand on the UL (more downloads than uploads). In a TDD system, this results in the DL being longer than the UL (the ratio is usually 3:1). This makes TBP problem a lot more challenging on the UL than DL since there are more DOFs but less symbols.

Latency

Latency is a key performance metric of a wireless network. The latency requirements are application dependent. Most real-time applications such as voice and live video have tight latency requirements, while best effort applications such as file-transfer, web, and e-mail are more tolerant of high latencies even though they might require higher throughput. Sources of latency include time of flight, encoding/decoding, and framing. Time of flight dominates in Satellite networks, but is less of a factor in high density terrestrial networks, where distances do not exceed tens of Kilometers. For these networks the size of the code word and the frame structure dominate the latency both these factors are strongly related STAP processing and will be discussed detail below. In some cases, the price paid for lowering latency is reduced throughput. For example, a shorter codeword decreases the coding gain (SINR), and shorter frame will increase the overhead. In general latency is measured by the minimum round trip time (RTT). This is usually referred to as the round trip latency. One way latency is approximately half the round trip latency System Optimization Exploiting Control/Header Symbols The header/control data sent by each node at the beginning of each subframe is composed of preamble (only in the DL), reference, and channel map symbols (only in the DL). In addition to these control symbols, known pilots are inserted between data symbols. Together, these enable nodes to synchronize (preamble), train the beamformer (reference symbols), allocate channel resources (maps), and estimate the channel response (pilots). When these resources are mutually exclusive (i.e. a different symbol is used for each purpose), then the system is not operating very efficiently. A first step towards increasing the time-bandwidth without increasing the overhead, is exploit all these resources for STAP training or reusing the same resource for multiple purposes. In this section, we present different techniques for utilizing the pilots, preamble and map symbols for training the beamformer in addition to the standard reference symbols. We first explore the properties of the different type of symbols that make them well suited for the functions they are designed to accomplish.

Beamforming

In order to improve the quality of the STAP processor, the reference symbols representing the training sequence must have the following properties:

Training sequences dedicated to different streams must be orthonormal. Examples of orthogonal code sets commonly used in wireless communications include Walsh-Hadamard codes, Constant Amplitude, Zero Auto Correlation (CAZAC) codes, and FFT codes. The Walsh-Hadamard code generates a set of orthogonal vectors (codes) whose length is always a power of 2. The value of each vector component can be either 1 or $-1$. The Walsh-Hadamard code of length $2n$ can be generated recursively from the $2n-1$ length code as follows:

$$H_n = \begin{bmatrix} H_{n-1} & H_{n-1} \\ H_{n-1} & -H_{n-1} \end{bmatrix}, H_0 = [1] \quad (19)$$

The generation of the CAZAC codes follows the following equation:

$$c_q[i] = \begin{cases} e^{-j2\pi \frac{r}{N}\left(\frac{i^2}{2}+qi\right)} & \text{if } N \text{ is even} \\ e^{-j2\pi \frac{r}{N}\left(\frac{i(i+1)}{2}+qi\right)} & \text{if } N \text{ is odd} \end{cases} \quad (20)$$

where $c_q$ is a complex column vector denoting the qth CAZAC code (q denotes the offset), $c_q[i]$ denotes the ith element of the qth CAZAC code, N denotes the length of the code, and r denotes the chirp used to generate the code (r and N must be relatively prime). For a fixed chirp and a fixed length, codes with different offsets (modulo N) are orthogonal (from the zero-autocorrelation property of the CAZAC codes). Unlike the Walsh-Hadamard code, there is no restriction on the length of the CAZAC code (i.e. it does not need to be a power of 2).

The FFT codes are using the complex exponential bases. The FFT code of size N:

$$w_k[n] = e^{-j2\pi \frac{kn}{N}} \quad (21)$$

where $w_k$ is a complex column vector denoting the kth FFT code (k denotes the offset), $w_k[n]$ denotes the nth element of the kth FFT code, N denotes the length of the code.

Figure 9A:
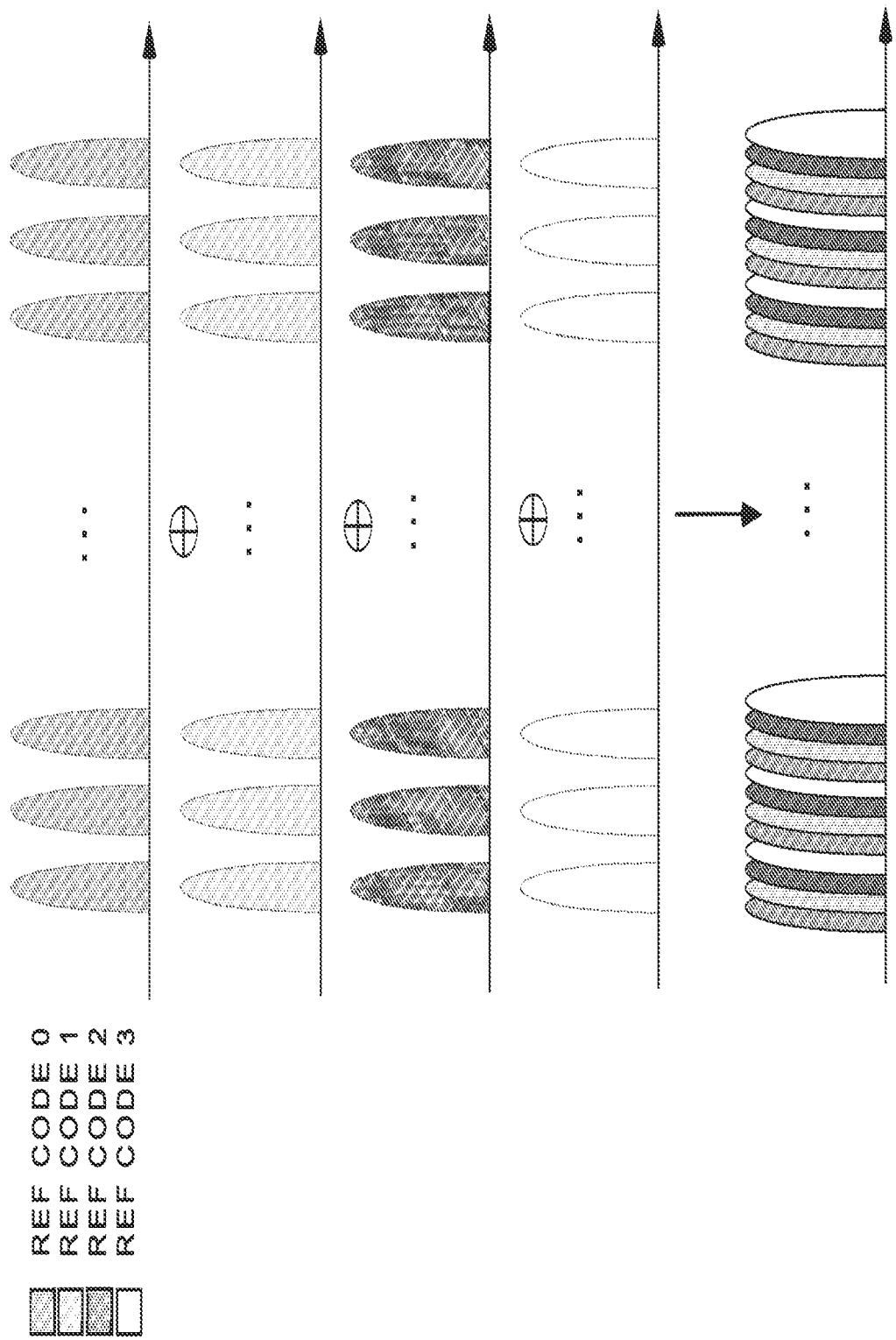
FIGS. 9A and 9B illustrate orthongal codes and orthogonal CAZAC codes, respectively.
Figure 9B:
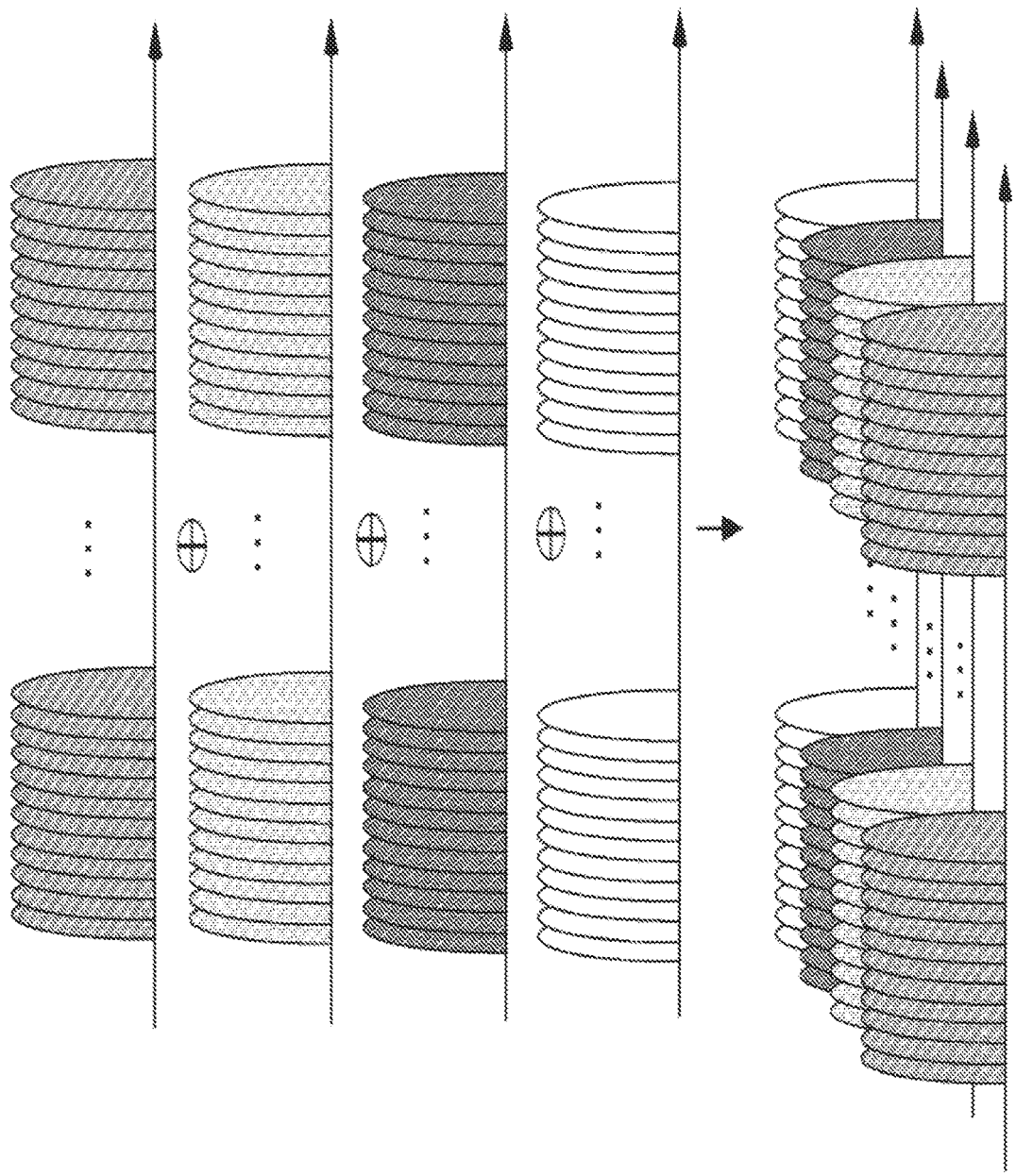

Since the STAP processor needs to estimate the beamforming weights across the entire frequency bands, the training sequences must have a large time-bandwidth product. Examples of codes with poor time-bandwidth product are FFT codes. In practice, the effective time-bandwidth product is also maximized when the signal has a very low PAPR in both time and frequency domains. This is another useful property of the CAZAC codes, which are designed to have constant amplitude in both domains. FIGS. 9A and 9B compare the time-bandwidth properties of FFT codes and CAZAC codes. The Walsh-Hadamard codes do not have the same PAPR performance as the CAZAC codes. The CAZAC codes also have the property that a cyclic shift in either the time or frequency domains produces another CAZAC code (the zero autocorrelation property).

Training data usually occur at the beginning of the frame to allow more time for the computation of the beamforming weights before the beginning of the next subframe. There is usually some tradeoff between the latency and the "freshness" of the weights, especially if the channel changes rapidly.

Channel Estimation

Figure 6:
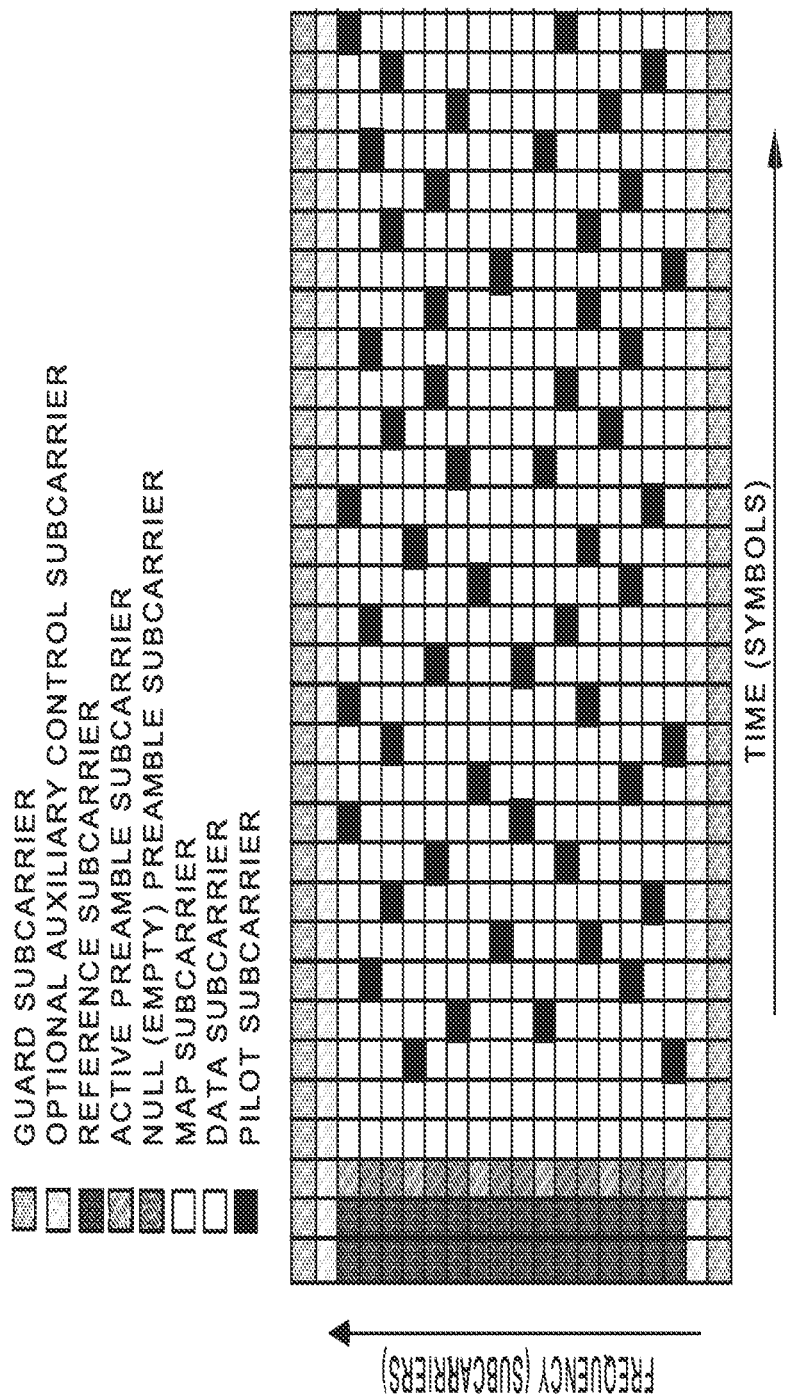
FIG. 6 illustrates an example of a structure of a DL frame.
Figure 7:
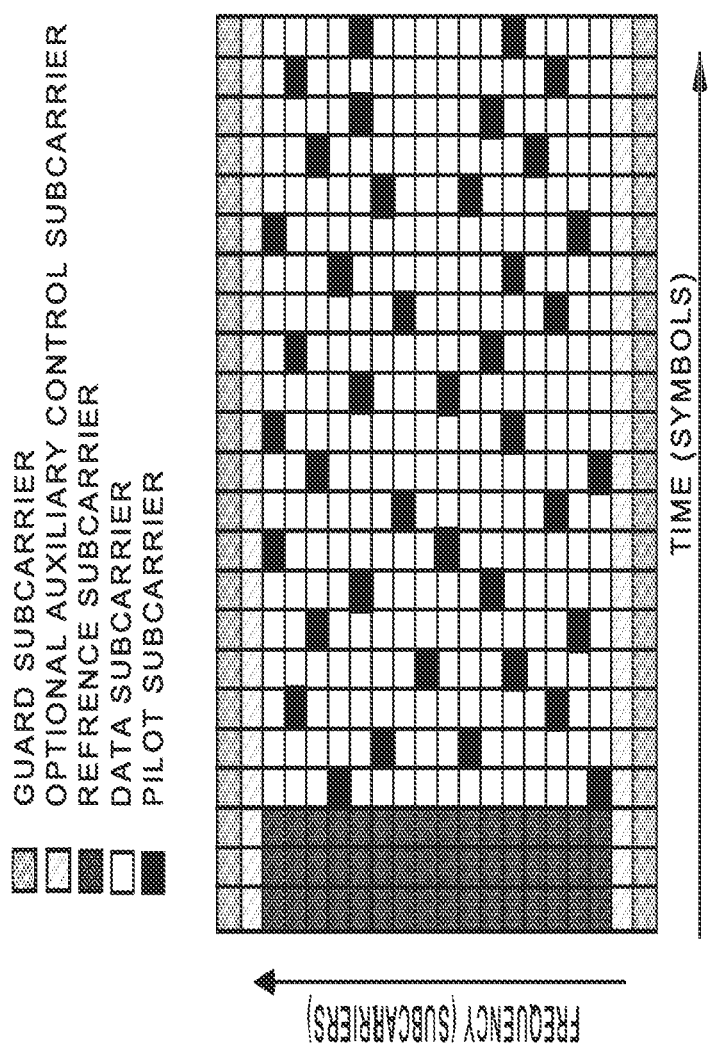
FIG. 7 illustrates an example of a structure of a UL frame.

Channels usually vary over time and frequency. In order to effectively track the channel over time and frequency pilots are spread out in both time and frequency. In an OFDM system, a fixed fraction of the time-frequency grid is occupied by pilot symbols that are evenly spaced in time and frequency. A typical distribution of pilots over the time-frequency grid is shown in FIGS. 6 and 7.

Time-Frequency Synchronization

At the beginning of each frame (on the DL subframe), the EN acquires the timing and frequency information for the CN. This process is aided by a preamble at the beginning of each DL subframe. The preamble symbol, known apriori by both sides of the link has following properties:

Low PAPR for better detection

Low rate modulation (e.g. BPSK or QPSK)

Periodicity in both time and frequency domains. It is desirable that the preamble symbols sent by neighboring CNs be orthogonal so that an ENs can lock to a particular CN if it uses the preamble code assigned to that particular CN. In WiMAX, Golay codes are used for pilot symbols. One of the constraints on the frame length is that the EN can maintain time-frequency lock for the duration of the frame.

Frame Control Information

Information such as channel allocation, MCS level, ranging, and power control are conveyed using map symbols at the beginning of the DL subframe (after the preamble and reference symbols). These map symbols are usually lightly coded (e.g. QPSK rate ½). The map symbols are not known apriori, and the information they carry are unique to particular EN and can change over time. The information content or the length of the map sequence depends on the channel dynamics and the number ENs sharing a stream. If the network is relatively static (i.e. nodes do not enter and exit the network very often, and hardly move around and their traffic patterns are relatively steady), then the map sequence can be very short, and the converse is true.

In conventional systems, the resources allocated for these four tasks are mutually exclusive. Therefore, there are many opportunities to either reduce the overhead or increase the TBP. We list the different ways in which one of the three resources above (pilots, preamble, maps) can either be eliminated to reduce overhead or reused for beamforming to increase TBP:

Preamble

The structure of the beamforming reference symbols (CAZAC codes) makes them suitable for TFS. Therefore, the preamble can either be replaced by another reference symbol of eliminated all together Maps 465

Using the map symbol for training the beamformer will require some decision directed processing since the content of these symbols is not known apriori. Furthermore, it is difficult to ensure high separation or orthogonality between map symbols intended for different ENs, which is necessary to improve the TBP. There are several ways to address these issues:

Coding (Modulation)

Let $S_{m0}[n]$ be the map symbol (or sequence of symbols) intended for stream 0, $s_{m1}[n]$ be the map symbol (or sequence of symbols) intended for stream 1, where n denotes the frame index, and c0, c1 are two orthogonal constant modulus code vectors (e.g. CAZAC codes), $s_{m0}[n]$, $s_{m1}[n]$, c0 and c1 all have the same length. Then instead of transmitting $s_{mi}[n]$ directly, we transmit a modulated (coded) version as follows:

$$\bar{s}_{m_i}[n] = s_{m_i}[n] \odot c_i$$

where $\odot$ denotes an element-wise product. At the receiver, we reverse the process in order to recover both the information encoded in the map sequence as well as the reference symbol. If we denote the received sequence (post beamforming) as $r_{m_i}^P[n]$ $$r_{m_i}^P[n] = h_i * \bar{s}_{m_i}[n] + w[n]$$

where $h_i$ is the channel response post beamforming, * denotes the convolution operator if the signals are in the time domain or the point-wise multiplication operator (i.e. same as $\odot$) if the signals are in the frequency domain, and w[n] is a white noise sequence. In order to recover the original map sequence, we multiply by $c_i^{*36}$ and equalize:

$$\hat{s}_{m_i}[n] = h_i^{-1} * r_{m_i}^P[n] \odot c_i^*$$

After decoding the received map sequence $\hat{s}_{m_i}[n]$, then we can recover the pre-beamforming reference sequence at antenna k by demodulating:

Where $\tilde{s}_{m_i}[n]$, is the decoded map sequence. The recovered reference sequence can be used for STAP processing like normal reference sequences. However, perfect orthogonality is not always guaranteed.

Auxiliary Channel Encoding

The above technique requires some decision directed processing to work. Although the map is much easier to decode than regular payloads, in some systems decision directed processing may not be desirable. The fix for that problem is to encode the map information in some auxiliary channel and free the map symbols. The auxiliary channel can be a small slice of the guard band used to transfer control information. This technique is only plausible in static or quasi-static networks, where the control overhead is very small to fit in an auxiliary channel. 494

Pilots

The pilot sequence is known apriori. These sequences are common to all streams (ENs), and thus are not appropriate for training the beamformer. However, the easy fix to this problem is similar to the solution used for the map symbols, which is to modulate the pilots with orthogonal codes uniquely assigned to each stream. The only difference is that no decoding is required in this case since the pilots are known on both sides of the link. It is desirable to group the pilots into separate symbols to make the processing easier.

Adaptively Stepped Modulation and Coding

The control/header symbols may not be sufficient to achieve the desired TBP, especially on the UL. In this case, the most straight forward way of increasing the TBP is to send more reference symbols. However, the penalty will be an increased overhead and reduced effective throughput. To reduce the overhead that accompanies the increased TBP, every additional reference symbol is replaced with a group of payload symbols with a lower MCS level than the normal payload symbols. For example, consider the following two cases. In both cases, the subframe is composed of 30 symbols. In the first case (Subframe 1 shown in FIG. 10a), the first 6 symbols are reference symbols (RL), while the last 24 are payload symbols (PL) at MCS level 256QAM/rate 6/8 (i.e. a total of 6 bits per sample). In the second case (Subframe 2 shown in FIG. 10b), the first two symbols are reference symbols (RL), the next 8 are payload symbols at MCS level 16QAM/rate 3/4 (i.e. a total of 3 bits per sample) (LPL), and the final 20 are payload symbols (PL) at MCS level 256QAM/rate 6/8. Since a payload symbol at MCS level 256QAM/rate 6/8 can carry the same amount of information as two payload symbols at MCS level 16QAM/rate 3/4, both Subframe 1 and Subframe 2 can carry the same amount of information. In order for the link to operate smoothly, the received SINR must be sufficient to decode 256QAM/rate 6/8 symbols with very low probability of error. Under this SINR level, the 16QAM/rate 3/4 symbols can be recovered with very high fidelity without the aid of the decoder (i.e. via quantization) using hard decisions demapping. The significance of this is that those "lightly" modulated symbols can be demodulated with low latency and high reliability, which means that they can be used as training symbols for—the beamformer, and the results (new beamforming weights) can potentially be available prior to the next subframe. Under this scenario, the ratio of the effective TBP of Subframe 2 to the effective TBP of Subframe 1 is 10:6 or 5:3 (i.e. a 66% increase in TBP) if we include those lightly modulated symbols 38.

Although the SINR is sufficient to recover the lightly modulated symbols without coding, coding can be useful in the presence of bursty errors. The output of the decoder is used validate the decision directed beamforming. If the number errors detected exceeds a certain threshold, then a number of actions can be taken:

The output of the beamformer can be discarded, and old weights can be used instead.

The MCS level of the "lightly" modulated payload (and potentially the regular payload) is reduced.

If the detected error rate is lower than a pre-specified threshold, the MCS level can be increased in order to maximize the data-rate and reduce the overhead. This process continues to adaptively change the MCS-level of the "lightly" modulated payload symbols as well as the regular payload symbols as the channel conditions require.

Adaptive STAP

As in the case with most systems, there is usually a tradeoff between the different system requirements. For example, although there is no tradeoff between the null depth and the number of beam nulls in theory, it's a different story in practice. More nulls require more DOFs. Since the length of the training period available in practice is finite, the depth of each null degrades when the training is spread over a larger number of DOFs. Similarly, there is also a tradeoff between the number of nulls and the null depth and the adaptivity of the system because a more adaptive system requires a shorter training period. Also, in practice different networks have different requirements in terms of capacity, latency, range, density, and mobility. Usually networks that have very high capacity requirements are fixed or quasi static. Therefore, trying to meet all these requirements simultaneously with a single implementation can results in cost and power consumption that are unnecessarily large.

Therefore, in order to make the best use of the finite resources available (i.e. DOFs, TBP) for a given environment, the different parameters of the system cannot be statically set apriori. Instead, these parameters need to be adjusted dynamically to fit the particular environment and set of requirements. For example, during transmission and reception, each node can measure the key properties of the channel (i.e. frequency dispersion, time dispersion, number of eigen modes). The amount of frequency dispersion of the channel can measured in multiple ways. If the node employs time-domain STAP, then the effective length of the time domain filter (the output of the STAP processor) is a good approximation of the effective length of the channel response 40. If the longest filter associated with any of the antennas has many trailing zero (or diminishing) taps, then the length of the filter can be shortened without degrading the network performance. In fact the performance improves since the TBP is spread over less DOFs or the system can potentially be more adaptive. On the other hand, if the filter has no trailing zeros, then system performance can potentially be increased by increasing the filter length, provided that there is sufficient TBP. In this case, the node keeps increasing the filter length until trailing zeros start to appear (or the new taps begin to diminish).

The same idea can be used even if the STAP is implemented in the frequency domain. If frequency domain STAP is employed, the implementation is slightly different. In the frequency domain, the parameter of interest that corresponds to the length of the time domain filter is the number of frequency subbands (i.e. bins) or the length of the subband. A longer time-domain filter corresponds to a larger number of smaller subbands, and conversely, a shorted filter in the time-domain corresponds fewer larger subbands. In order to determine the minimum number of subbands necessary to equalize the channel, the difference between the normalized weight vectors of adjacent bands is computed. If the square magnitude of the largest difference is small enough (less than a pre-determined threshold), then the channel is flat over the neighboring subbands, and these subbands can be merged to form larger subbands. Otherwise, the subbands are split until the beamforming weight vector is almost flat across neighboring subbands.

Similarly, spatial DOFs (i.e. antennas) can also be optimized/minimized the channel rank and the number of interferers. This can be done by applying SVD or EVD to $R_{xx}$. The number of significant eigen/singular values of $R_{xx}$ determines the number of spatial signals. To determine the minimum number of spatial DOFs, $R_{xx}$ is continually analyzed for a decreased number of antennas until the matrix becomes overloaded.

Since the spatial and temporal DOFs do not operate independently. A more accurate method would jointly estimate those parameters in order to find the minimum combination. Note that this process of optimizing the filter length or number of antennas either in the time or frequency domains is done on a per node basis independent and without having to coordinate with other nodes in the system. Also, this process does not need to be performed very frequently since these properties of channel are expected to remain static for fairly long periods.

The other quantity of interest is the Doppler spread or time variation of the channel. With the knowledge (or an estimate) of the Doppler spread of the channel, the optimum beamforming weight update rate (or the theoretical maximum TBP) can be determined. Ideally, the nodes in the network are better off extending their training periods whenever possible. However, unlike the frequency dispersion (delay spread), estimating the time dispersion or the Doppler spread is a little trickier. Since the STAP weights might change from frame to frame in response to changing weights on the other end of the link or to the presence of a new interferer, this might give the illusion of time variation in the channel. Also, the weight update rate needs to be coordinated across the entire network, and cannot be changed independently for different nodes. Therefore, some coordination needs to take place between CN and its associate ENs and between neighboring CNs. Also, the frequency dispersion properties of the channel are usually more static than the time dispersion of the channel.

There are different categories of channel variation, each having different properties that need to be understood. The first thing to note is that any change in the properties of any significant RF path/ray (i.e. to it's length, AOA, AOD) can impact the outcome of a STAP algorithm. The channel variation is characterized by the Doppler spectrum, which plots the power (magnitude) of the change versus the rate of change (or normalized rate of change) in Hz. Although the change in channel response different across the band, the rate of change is usually constant over a wide portion of the spectrum. When one or both of the end nodes move around, the motion affects all the paths that form the channel, whereas the movement of reflectors/scatterers only affect the path or group of paths associated with them. The former clearly results in higher Doppler spreads is very common in mobile environments like cellular networks, but is absent in fixed wireless networks like backhaul. The latter is present in most environments that are not pure LOS. However, the impact is usually much lower since it only affects a small fraction of the paths, and moving reflectors (e.g. cars, trucks, humans) usually have a much smaller surface area than static reflectors (e.g. ground, building walls). The channel variation caused by these movements manifests itself in different ways. First, when the length of the path varies, both the amplitude and phase response of the path change.

The amplitude (path loss) can be expressed as follows:

$$g(r) \sim \left(\frac{\lambda_c}{r}\right)^2 e^{-\alpha(\lambda_c)r} \quad (22)$$

where $g(r)$ is power gain of the path as a function of the length r, $\lambda c$ is the carrier wavelength, and $\alpha\lambda e$ is the path loss exponent of the medium as function of the carrier wavelength. In free space, $\alpha\lambda c=0$ and Equation 22 is reduced the square law Friis Equation. We can assume that air behaves approximately like free space and drop the exponential term. In either case, any significant change in path loss due to change in the path length requires significant change in either the path length r or the carrier wavelength $\lambda c$. Such change usually requires at least several seconds (even in highly mobile systems) and several hundred MHz to be realized. Such fading is referred to from a spatial (area) standpoint as large-scale fading, and from a temporal standpoint as slow fading. In the frequency domain, the fading is flat. 618

The phase response of a particular path changes more rapidly than amplitude since the phase rolls over when the distance traveled by the moving object is of the order of the carrier wavelength (less than a meter in the worst case). Although the change in the phase response of a single path does not affect its amplitude response, it does affect the aggregate response of all the paths (all the paths that fall within the same sample period) since the paths add constructively or destructively depending on their relative phase response. The rate of change of the phase response of a particular path is known as the Doppler shift (in Hz). The quantity of interest is not the Doppler shift, but the Doppler spread, the Doppler spread between two paths is the difference between their shifts. The power of the Doppler spread is determined by the amplitude of the smaller path. The "weighted" collection of Doppler spreads makeup the Doppler spectrum of the channel. The maximum "significant" Doppler frequency (spread) determines the effective rate of channel variation. For example, if the target SINR is 25 dB, then every component of the Doppler frequency that is larger than −25 dB cannot be ignored. A Doppler spread of less than 1 Hz is considered slow fading, less than 10 Hz is considered medium fading, and fast fading if larger than tens of Hertz.

If the change in the length of the channel is large, then delay difference can be large enough such that the path falls in a different tap/sample period. This leads to a change in the frequency response of the channel. This is only a concern when the effective delay spread of the channel is much larger than the sampling period. In this case, the channel is both time-varying and frequency selective.

The attenuation of the path response can also occur as a result of change in the AOA or AOD due to the movement of one of the end nodes or a reflector or as a result of the change in the effective surface area of the reflector due to the motion. Also, the moving object may be a shadow as opposed to a reflector, in this case the motion may cause a path to briefly disappear or severely attenuate and then reappear.

In all cases, the variation occurs in the channel response itself. However, any change to the key the properties of the channel like the delay spread and angle spread is likely very small and very slow if any (especially for a large scale network). Also, although the change in the frequency response may not be the same across band, the rate of change or Doppler frequency should be constant.

Given these properties of the channel, it is sufficient for node to measure the channel variation rate over a small slice of the band (i.e. control/aux channel) or even use an unlicensed neighboring band if it is close enough. For these channels that are used to estimate the Doppler spread, the Tx and Rx beamforming weights must be kept constant for a sufficiently long period of time, which is not the case for the regular payload. This subchannel can also be multiplexed among the different nodes, but this is not necessary. Care needs to be taken when estimating the Doppler spread since the beamforming weights are affected by Doppler spread of the interfering channels as well. Therefore, the effective Doppler spread of the channel, like the effective delay spread, depends on both the desired channel as well as the interfering channels. When both Tx and Rx weights are fixed, then the effective Doppler spread (both rate and magnitude) can be estimated by observing the SINR on those channels. The SINR plot as a function of time (for a given window of time) will have a periodic structure. The energy of high frequency portion of the Doppler spectrum relative portion near DC represents the fraction of the channel that with significant time variation.

If the available TBP of the measured channel is not sufficient, then TBP requirement can be met either by reducing the target SINR or by sharing/multiplexing the channel 53. Reducing the target SINR can reduce both the effective delay spread and the effective maximum Doppler spread 54. Multiplexing the channel reduces the effective number of interferers, and thus some of the spatial DOFs can be freed up to cancel out some of the excess delay. The two techniques have different effects on both TBP and system capacity. Sometimes the desired TBP requirement cannot be met with a single technique.

Similar ideas can also be used to estimate other channel properties, such as the angular spread. In any case, the process requires novel ways to both collect and process the data.

Hierarchical/Scalable Feedback Beamforming

Several techniques of estimating the optimum beamforming weight vectors were discussed. These techniques fall into two broad categories: direct matrix inversion (or DMI) and gradient descent. DMI usually produces the highest SINR for a given TBP, at the price of higher complexity, which grows cubically in the number of spatial DOFs. Gradient descent has a much lower complexity (quadratic in the number of DOFs), but requires more training and suffers a higher misadjustment loss.

For many wireless networks the capacity requirements to support the growing number users and applications is increasing at exponential rates. With crowding spectrum, STAP and spatial reuse becomes more critical than ever. However, even for STAP to keep up with the required capacity, it needs to be able to handle a growing number of DOFs. Increasing the number of DOFs comes with several challenges, one of which is computational complexity (and power consumption). The other challenges/limitations are size (form factor), TBP, and transferring large blocks of data across array.

To enable a scalable and extensible architecture, the algorithms must be designed such that the computation can be spread over several processing units (PUs) that can be distributed, with minimum loss of performance compared to centralized processing, and the communication between these PUs is minimized, and more PUs can be added with very little change.

This scalable architecture has both a hardware and a software component. The hardware component is composed of many smaller PUs as building blocks. Two basic types of PUs are shown in FIG. 11. The first type, $PU_{RF-D}$, shown in FIG. 11a is an RF to digital (Rx) and digital to RF converter. $PU_{RF-D}$ contains K complete transceiver chains (from the Filter/Switch/LNA to the ADC for Rx, and from the DAC to the PA/Switch/Filter for Tx), and contains M sets of independent beamformers (i.e. outputs M independent streams) The $PU_{RF-D}$ has five types of bi-directional ports: RF ports that typically connect to the antennas (Type A), digital data ports for sending and receiving the data to be received/transmitted (Type B), digital control ports for transmitting and receiving control signals (includes the beamforming weights) (Type C), commands for programming the bandwidth and the lengths of the filters), a port for receiving a reference clock (Type D), a calibration port (Type E). Each $PU_{RF-D}$ has its own internal calibration unit. The K transceivers inside a $PU_{RF-D}$ are calibrated relative to the internal calibration unit. The internal calibration units across different $PU_{RF-D}$ chips are all calibrated relative to an external calibration source. The second type, $PU_{RF-D}$, shown in FIG. 11b is a digital combiner (Rx) and splitter. The purpose of the $PU_{D-D}$ is to allow cascading more $PU_{RF-D}$ and $PU_{D-D}$ chips. The $PU_{D-D}$ also has four types of bi-directional ports: K digital ports for transmitting and receiving (i.e. aggregating) data from $PU_{RF-D}$ chips and $PU_{D-D}$ chips that are closer to the antenna (Type A), M digital ports for sending and receiving data from a central processing unit (CPU) or $PU_{D-D}$ chips that are closer to the CPU (Type B), ports for sending and receiving control data (Type C), and port for the reference clock.

The software component is DSP architecture, which is key to achieving close to the performance levels that are close to optimal. A full least squares solver clearly won't scale for two reasons. First, processing a new data sample scales quadratically with the total number of spatial DOFs. $K_\Sigma$=RK. The computation $R_{xx}$ and $R^{-1}_{xx}$ requires data from all $PU_{RF-D}$ chips. Therefore, in order to distribute the computation among the different $PU_{RF-D}$ chips, large amounts of data (scales linearly with K, need to be transferred to each $PU_{RF-D}$. This leaves two options. First, each $PU_{RF-D}$ can perform its own local rank K DMI. In this case, no communication between the different $PU_{RF-D}$ chips is necessary, and the total number of computations scale linearly with K. The results from each subarray are then combined at the next level $PU_{D-D}$ chipsets. The disadvantage of this approach is that if K.>>K, then the performance is highly suboptimal. The second option is to use some variant of LMS (e.g. NLMS). A closer examination of Equation 14 reveals that the equation can be rewritten as a series of K independent scalar equations:

$$w_k[n+1] \leftarrow w_k[n] + \mu_{NLMS}[n]e[n]x^*_k[n] \forall 0 \le k < K_\Sigma \quad (23)$$

These scalar weight updates can be applied independently at each $PU_{RF-D}$, where the weight filter at each antenna k is updated at $PU_{RF-P}$ the antenna is attached to. The only term that cannot be computed at the $PU_{RF-D}$ chips is the complex scalar $\mu_{NLMS}[n]e[n]$. This term can only be computed at the CPU, and then sent back to each $PU_{RF-D}$. However, the computation of NLMS[n]e[n] is distributed among the $PU_{RF-D}$ chips and aggregated at the subsequent PU D-D stages until it reaches the CPU without needing transfer any data between the $PU_{RF-D}$ chips.

Therefore, the NLMS algorithm satisfies most the requirements of the scalable architecture listed at the beginning of this section. First, the overall computation complexity per weight update scales linearly with the total number of antennas, and this computation can be spread evenly over the $PU_{RF-D}$ chips. Second, the amount feedback required by each $PU_{RF-D}$ is independent of the number of antennas K. Third, additional $PU_{RF-D}$ and $PU_{D-D}$ chips can be added to extend the existing array without any major change in CPU software. Finally, the output beamformer is a result of full array as opposed to subarray processing. Also, since the LMS algorithm is adaptive in nature, it inherently tracks channel variations.

The performance gap between NLMS architecture and the idea full least squares solution lies in two interrelated areas. First, there is the inherent misadjustment associated with the LMS algorithm (see Equation 13). Second, there is the extra TBP required by LMS relative to DMI, which can ten times larger. There are several techniques that can be used to reduce the performance gap while maintaining the scalability of the architecture:

1) The STAP processing occurs over multiple stages. At the outermost stage runs NLMS on the entire array. In the innermost stage (in the CPU), the outputs of the LMS beamformer from $PU_{RF-D}$ and $PU_{D-D}$ chips enter the CPU to be processed. If they are summed up directly without any additional processing, then no additional there is no additional gain beyond what the NLMS already provides. However, the CPU can add an additional layer of processing by performing a weights combination of its inputs. The new weights can be computed using a DMI algorithm. The DMI algorithm operates over a reduced number of DOFs, and thus requires a much less TBP. The reduces DMI weights can be updated more often than the NLMS weights.
2) At each $PU_{D-D}$ where signals are combined, the number of spatial DOFs are reduced by the branching factor of the previous stage. Thus, the TBP requirements become less. So additional performance gains can be realized combining inputs using weights from another NLMS process that runs on these subsequent stages. This NLMS process combined the input data using longer time domain filters (or smaller frequency domain subbands). The process is allowed to use more temporal DOFs because of the reduction in the spatial DOFs.
3) Each adaptive filter process running in one of the inner stages must have separate instance for each independent link (i.e. data stream). So for the DMI described in item 1, $R_{xx}$ is no longer shared among the different streams.

Combining these techniques, the outer loops running NLMS can viewed as estimating the static and slowly 746 varying components of the channel (e.g. DOA), while DMI component is used to quickly adapt to the more dynamic parts of the channel and more providing deeper nulls. However, when multiple adaptive algorithms are running simultaneously at different levels, care must be taken in choosing the boundaries when the weights are applied in order to avoid any potential instability.

Figure 12:
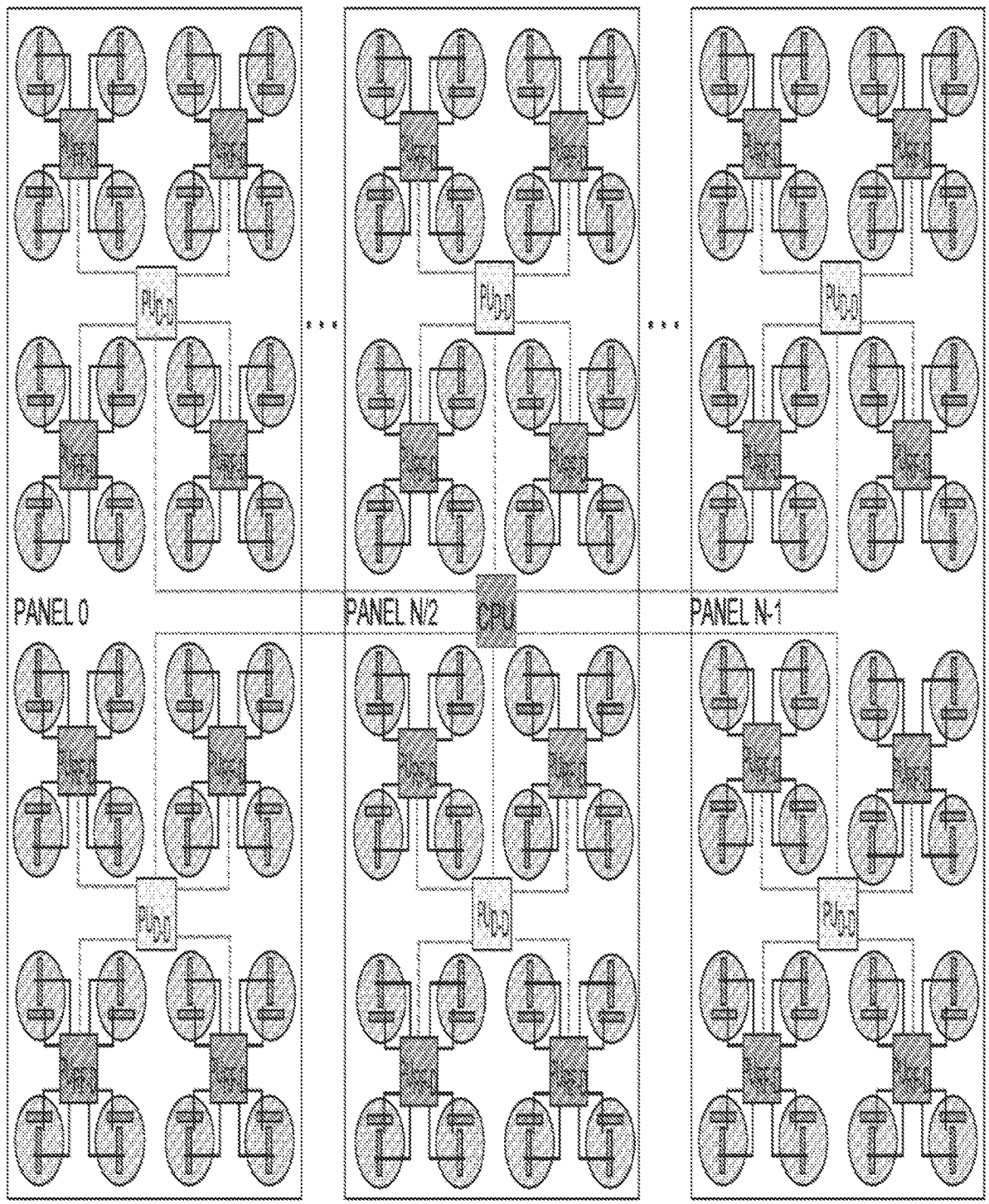
FIG. 12 illustrates an example of a hierarchical array structure.

FIG. 12 shows an example of this hierarchical interconnect. The green boxes ($PU_{RF-D}$) perform the outer NLMS computation, the yellow boxes ($PU_{D-D}$) perform signal aggregation, optionally using another NLMS process with high order filters in the time or frequency domain, and the red box (CPU) performs the final signal combining via DMI/least-squares. If $K_\Sigma$ represents the total number of antennas connected to the green boxes, and $K\sigma$ represents the number of ports to be combined in the CPU via DMI (the purple lines in FIG. 12), and assuming no additional processing in the yellow boxes, then the total computational complexity becomes $O(MK^2_\Sigma\text{-}MK^3_\sigma)$, where M is the number of independent streams. The first term, $MK^2_\Sigma$ is the NLMS complexity, and the second term $MK^3_\sigma$ is the DMI complexity. The cost of running DMI over the entire $K_\Sigma$ is $O(K_\Sigma^3)$ Therefore if $K_\Sigma \gg K\sigma$, M, then the saving will be huge.

One other very important advantage of spreading the computation over several distributed PUs is in the area of heat dissipation and thermal cooling. One critical requirement for low cost outdoor deployments is that the equipment must be passively cooled. This requirement is almost impossible to meet if the bulk of the computation were concentrated in a single processing unit. Furthermore, with more antennas, the Tx power requirements can also be spread over a larger number of smaller PAs.

Elevation Beam Steering/Multi-Dimensional STAP

The ability of a wireless node to cancel interference depends on the number of antennas (spatial DOFs) K. In particular, the dominant parameter is the number of antennas in the horizontal (azimuth) dimension $K_{az}$, or the effective azimuth width of the array. This is a result of the fact that in most practical deployments, nodes are uniformly distributed over 360° in the azimuth, while the elevation angular spread is usually much smaller (on the order of 10-20~ at best), which places some limits on minimum the size and form factor of the node. Small and compact form factors are critical for ease of deployment (specifically for ENs), especially in locations that might have some regulatory restrictions on the size of the equipment (e.g. street lamps). Therefore, other dimensions need to be exploited in order to achieve the required interference cancellation while keeping the overall package as compact as possible.

Figure 13:
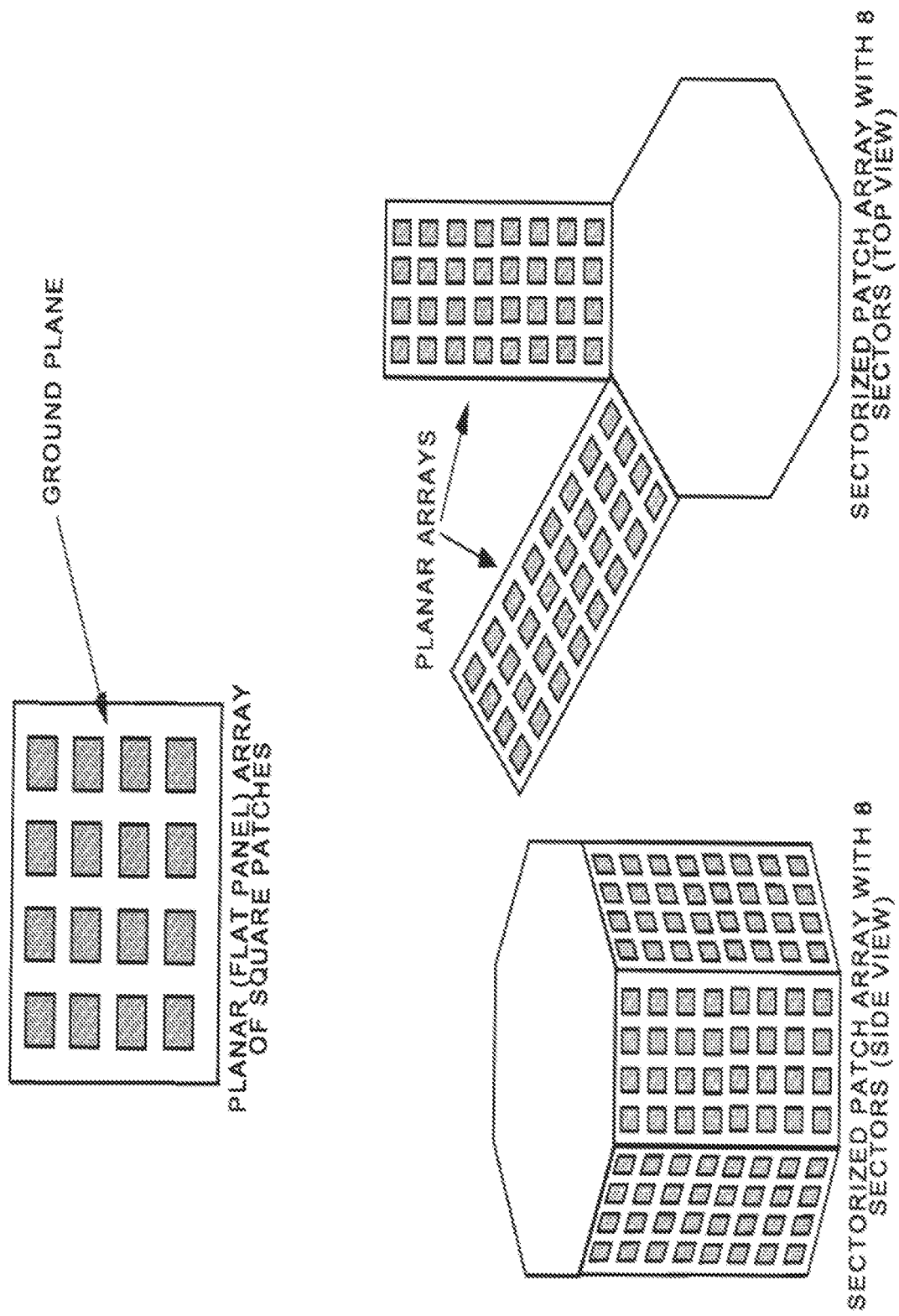
FIG. 13 illustrates an example of an implementation of antenna patch elements.

Before discussing different techniques for exploiting other dimensions, the first step is to understand the potential gains from these dimensions. The first dimension that can be exploited is the time/frequency dimension, which was discussed earlier. The temporal dimension can be exploited without affecting the size and form factor. The penalty will be extra computation and more TBP requirements. The effect of increasing the temporal DOFs is that they make the existing spatial DOFs more effective in interference cancellation. So instead of wasting spatial DOFs in canceling excess multipath, they can be better utilized for canceling new interferers. Increasing the temporal DOFs beyond what is necessary to equalize the channel yields little no performance gains 65. The second dimension is the antenna/array height. The effective height of the antenna defines the width of the elevation beam. The elevation pattern of the array, if properly designed, can help filter out a lot of the interference coming from outer cells, especially those that are far away. The third dimension is the other non-boresight horizontal dimension. While most CN and basestation antenna designs arrange the antennas over two horizontal dimensions (see FIG. 13) in order to get maximum coverage since most of their client ENs are uniformly spread out, the benefits from a 3-dimensional design can also be realized at the EN as well. The ENs can benefit in multiple ways. The increased field of view gives the EN the ability to associate with multiple CNs either for increased capacity or redundancy. Also, in a multipath environment, where beams can arrive from any direction with equal probability, the additional antennas (DOFs) in the non-boresight dimension can be just as effective in interference cancellation as those in the boresight dimension.

Figure 14:
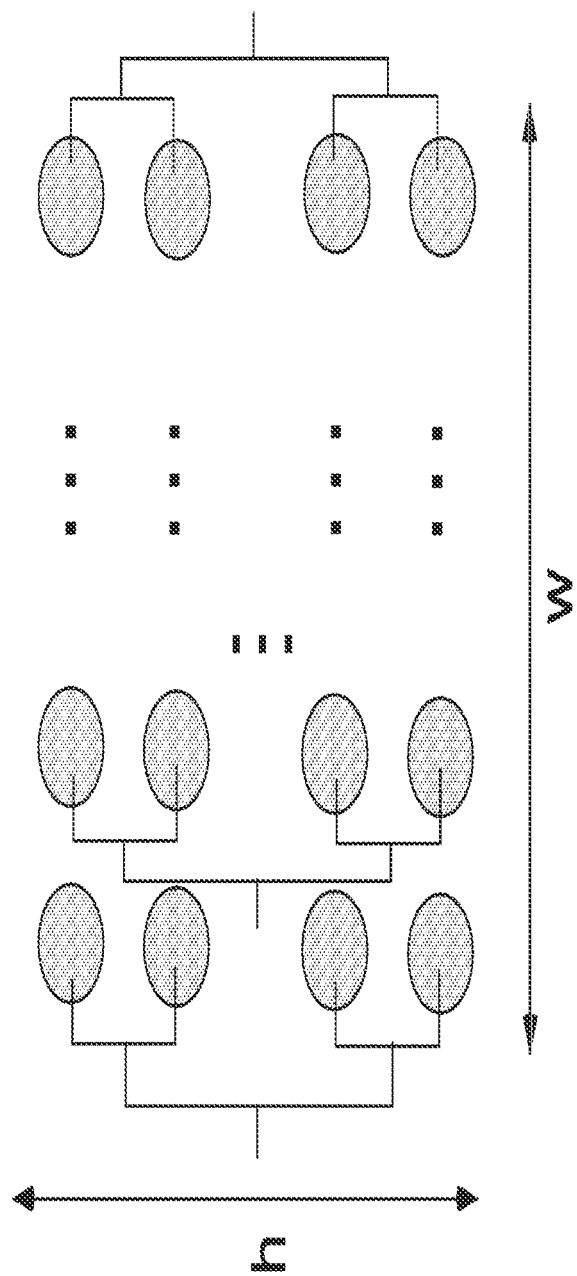
FIG. 14 illustrates an example of a vertical stack implementation of patch antennas.

The most straight forward way to exploit the height dimension (elevation gain) of the array is to increase the elevation gain of each antenna element. This can be done by connecting a vertical stack of patch antennas using a corporate feed as shown in FIG. 14. When the elevation gain is large enough, the next step is to add a tilt to the elevation beam. Although this process can help filter a significant fraction of the out of cell interference, it has several disadvantages. First, the nodes will require some manual alignment; something many wireless operators would like to avoid. Second, ENs are likely to be spread out across the cell, each may require a different tilt from the CN, whereas the CN only have a single tilt 68. Third, degrading the channel towards out of cell ENs, makes it harder for these ENs to connect to multiple CNs to increase capacity and reliability. Fourth and finally, in some situations a downtilt can make it more difficult to take advantage of diffraction on building tops, which might degrade the signal propagation. The first problem can be addressed by making the tilt software-programmable by adding programmable phase-shifters and delay-lines before the feed-point of each patch element, but this does not address the last three issues. These challenges can be overcome by incorporating adaptive elevation steering.

Figure 15:
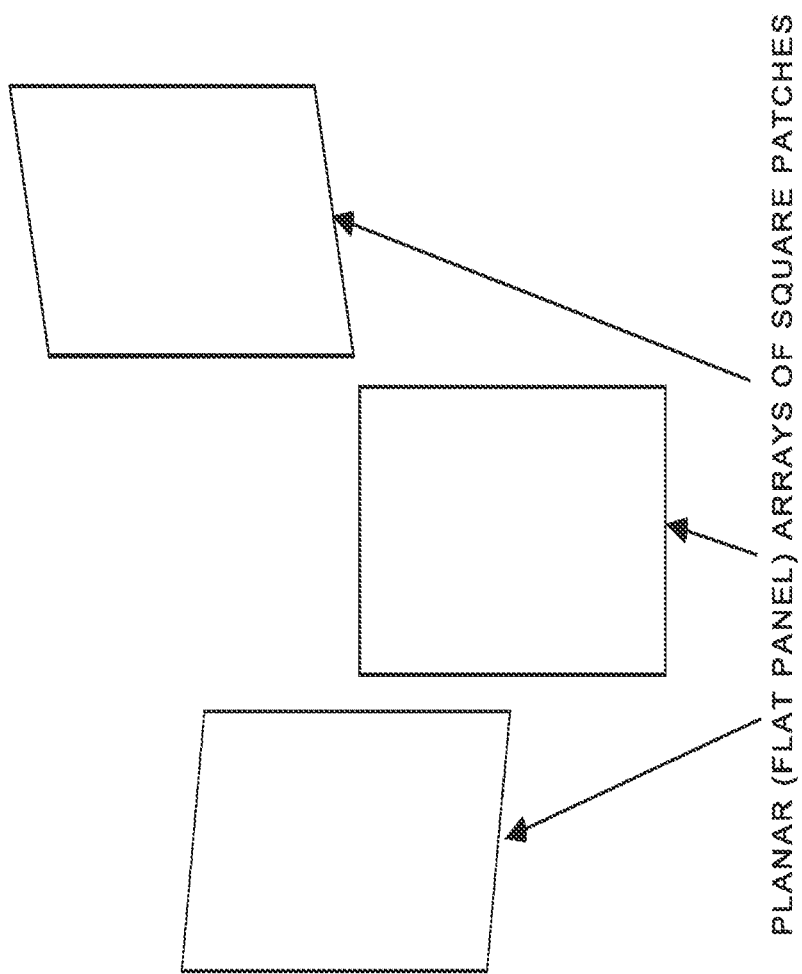
FIG. 15 illustrates an example of an implementation of a distributed CN panel design.
Figure 16A:
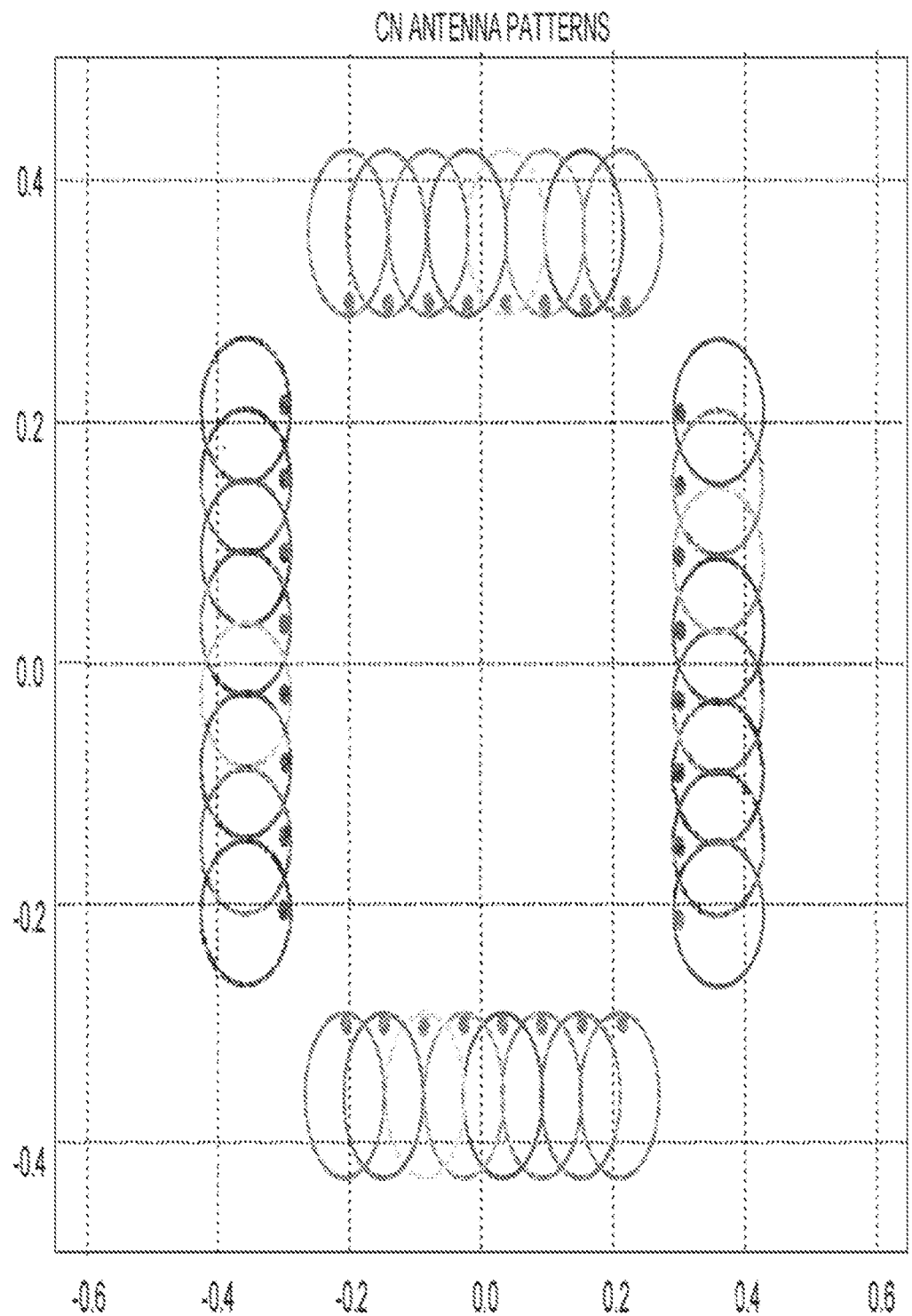
FIGS. 16A-16D are a graph of antenna patterns of a square multi-dimensional array, a half square multi-dimensional array, a semi-circle multi-dimensional array and a back to back linear multi-dimensional array, respectively.
Figure 16B:
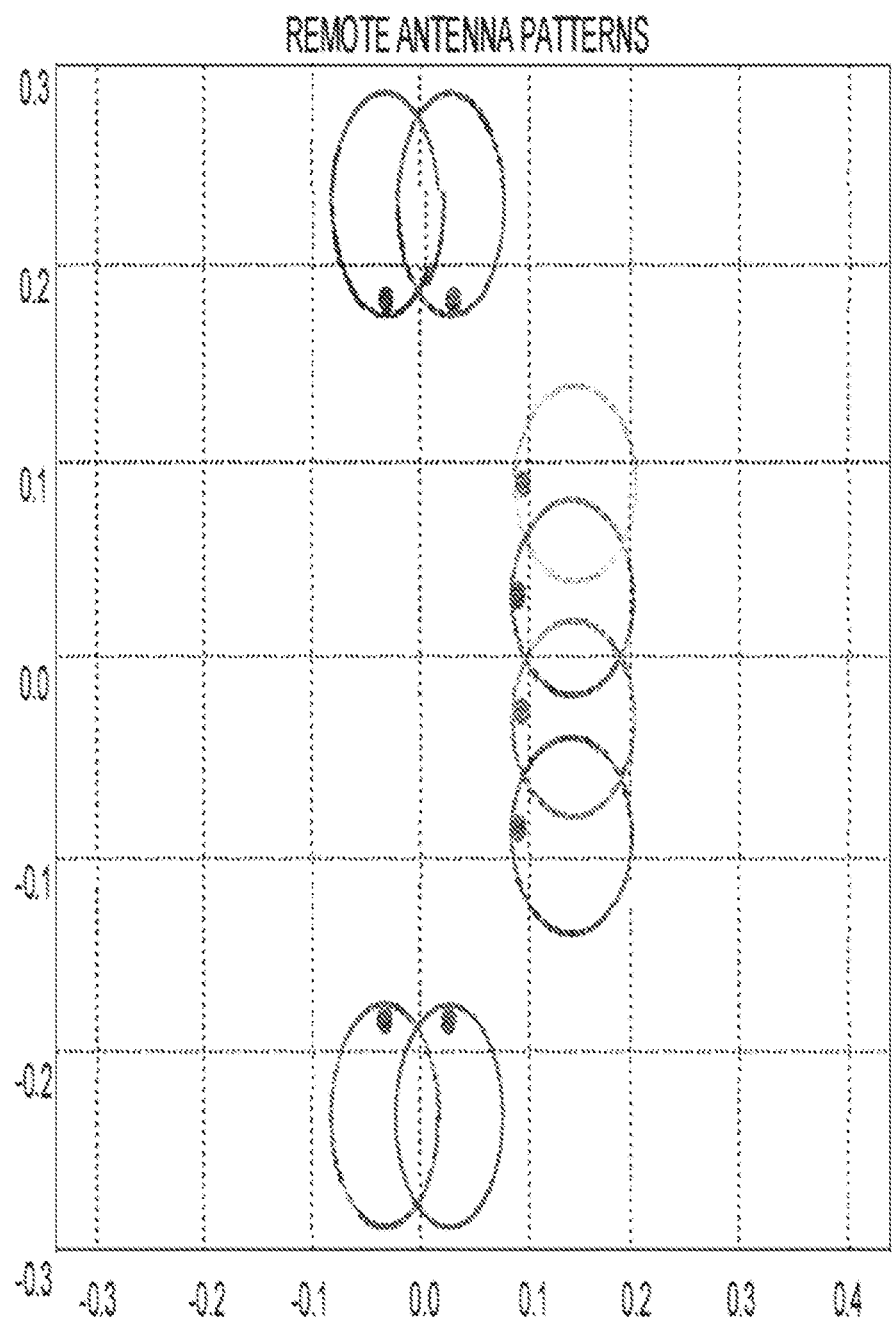
Figure 16C:
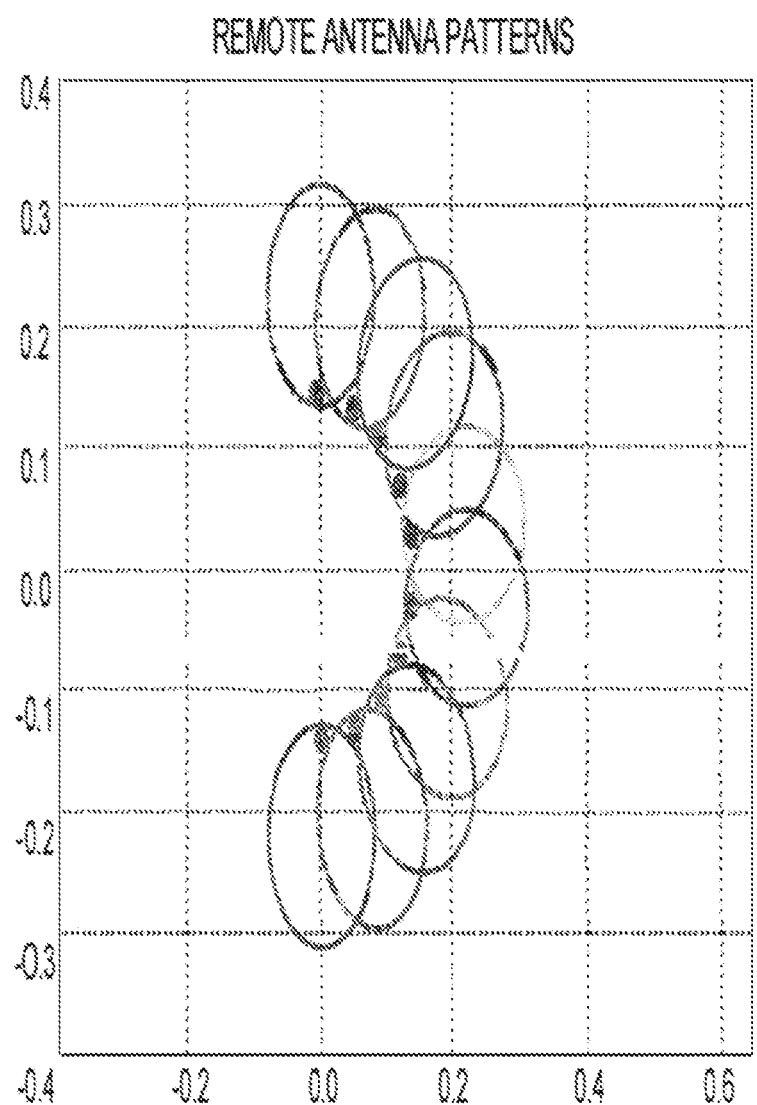
Figure 16D:
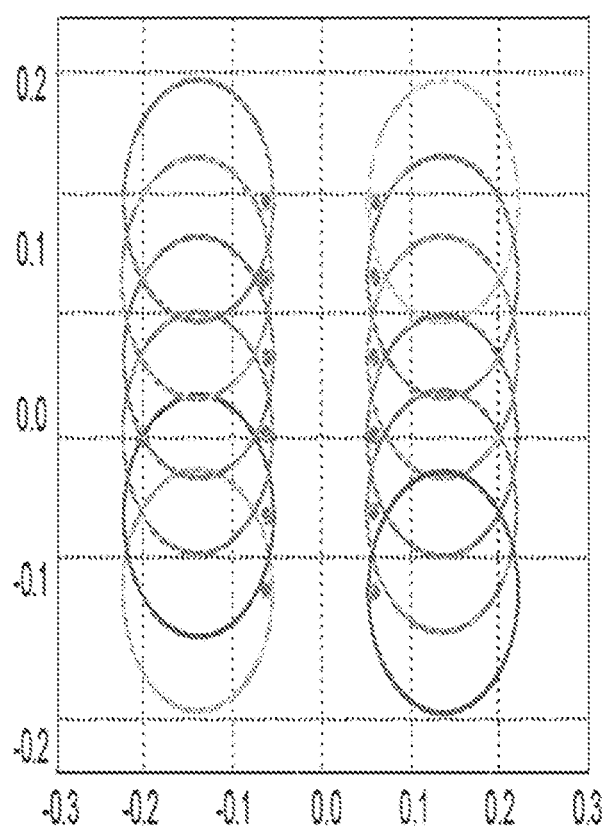

The benefits of adaptive elevation steering can be realized with a significant increase in complexity by using some DSP and dimensionality reduction techniques. If Nr is the number rows in the array and Nc is the number of columns, then the complexity running a DMI on the full NrNc is $\sim(NrNc)^3$, while running a DMI just on the columns (assuming that the antennas in each column are hard-connected) results in a $\sim N^3_c$ complexity. If instead, a hierarchical architecture is used, where NLMS is used to process the entire array while DMI is only used on the rows, then the resulting computational complexity becomes $O(MN^3_{c+}MNrNc)$, where M is the number of independent streams to be processed, a factor of M increase in complexity. An alternative method to avoid the extra factor of M reduces the dimensions of the array by first forming a set of Nr and Nc DOFs each is a result of summing a row or a column. The computational complexity of DMI now becomes $\sim(Nr+Nc)^3$. The extra factor M savings comes at the expense of some loss in optimality from the dimensionality reduction. In either case, the computational complexity represents a vast improvement over a full array DMI although still slightly larger than the columns-only DMI. The columns-only DMI complexity can be achieved with geometrically re-designed array as shown in FIG. 15. The Figure shows the different panels (or sectors) that have different offsets relative to one another in the vertical axis. These offsets increase the effective height of the array and provides it with some adaptivity in the elevation beam. This adaptivity is built into the standard STAP processing without needing to make any changes in the software. The penalty that comes with this technique is the extra space requirements.

Exploiting the dimension (the second horizontal dimension) can be accomplished by the redesigning the antenna geometry. FIG. 16 shows several compact geometries. The appropriate geometry depends on where the link is mounted. If the link is most mounted on a wall or a pole, then a half-square or semi-circle may offer the best performance relative to size.

Dual-Band TDD Communication

In order to exploit the full benefits of STAP, we need to apply it at both ends of the link, the TX and the RX. Computing the optimum RX weights can be accomplished with the techniques described above. In a TDD system, both TX and RX are on the same frequency channel, and thus the channel response is the same provided that it remains constant long enough (i.e. the coherence time is larger than a single frame Tc>Tf).

This property is known as channel reciprocity and it holds regardless of the channel conditions (e.g. LOS. Rician. Rayleigh). In this case, the RX beamforming weights can also be used for TX as well. That means that not further training is required for TX beamforming. This is one of the main advantages of TDD. The main disadvantage of a TDD system is latency. The latency in a TDD system is at least Tr long. This may not be significant for a single hop link, but it starts adding up when multiple links are to be cascaded. If latency is to be reduced by reducing Tf, then the overhead (TTG+RTG) becomes more significant. Also, TDD systems require network-wide time synchronization. TDD is sometimes referred to as half-duplex since the transmitter and receiver are not on at the same time. Examples of TDD systems in use today include WiFi and ZigBee. TDD is also beginning to gain traction in cellular networks with TDS-CDMA (in China), WiMAX, and TD-LTE.

FDD systems do not have the same latency problems as TDD systems since both ends of the link are transmitting simultaneously on different frequency bands (The DL and UL are on different bands.) There are several disadvantages of FDD. First, the UL and DL frequency allocations are static even though the traffic maybe asymmetric. Second, there needs to be sufficient separation between the UL and DL bands in order to achieve good isolation. Otherwise, expensive filters/duplexers with sharp cutoff are required. This increases the spectrum costs. Finally, and most importantly from a STAP perspective, there is no straight forward mapping between the UL and DL channel responses in an environment that is not pure LOS. That means that implicit or retro-directive beamforming cannot be used. In this case, explicit feedback is required from the other end of the link, which increases the overhead, and may perform poorly if Tc of the channel is too small. FDD is sometimes referred to as full-duplex since both the transmitter and receiver are on simultaneously. FDD is commonly used in high latency networks like Satellite, and long distance networks P2P networks like microwave. FDD is also prevalent in cellular networks as well, mostly for legacy and backwards compatibility reasons.

Figure 17A:
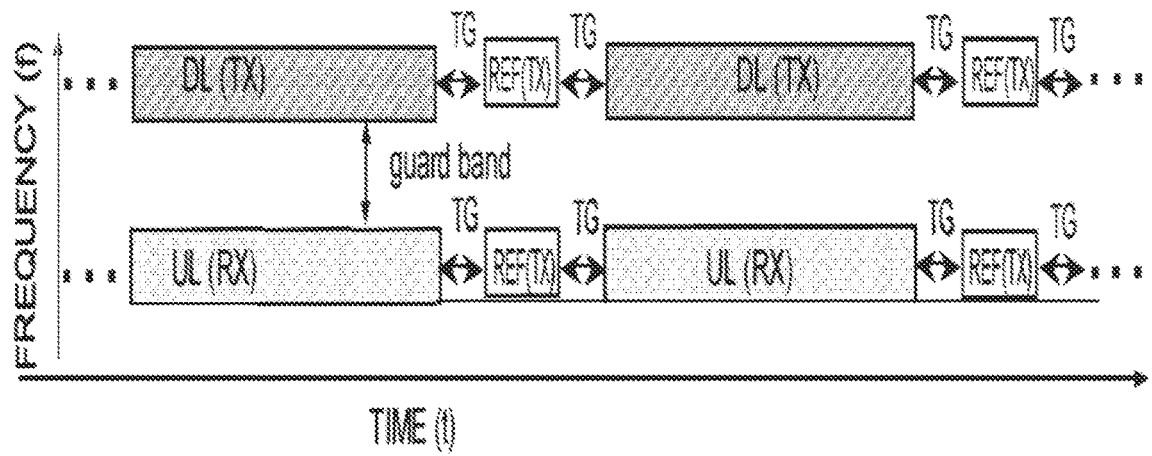
FIGS. 17A and 17B illustrate a frequency division duplexing with reference symbols and a dual time division duplexing, respectively.

There are several ways to address the shortcomings of existing duplexing/framing techniques. The first method injects reference symbols between FDD frames, as shown in FIG. 17a. The reference symbols forces each transmitter to briefly go into receive mode in order to learn the channel response and compute the Tx beamforming weights. The additional latency that is incurred in this framing structure is the total length of the reference symbols TTG+RTG. Unlike conventional TDD, the latency independent of the frame length. However, the additional latency is also additional overhead. The overhead can be reduced by increasing the frame size up to the coherence time of the channel. Another limitation of this scheme is that the training of the Tx weights is limited to the reference symbols. That means that pilots, control blocks, and payload data (i.e. decision direction) cannot be used in the STAP. This severely limits the achievable TBP for the Tx weights, without increasing the overhead. 868

Figure 17B:
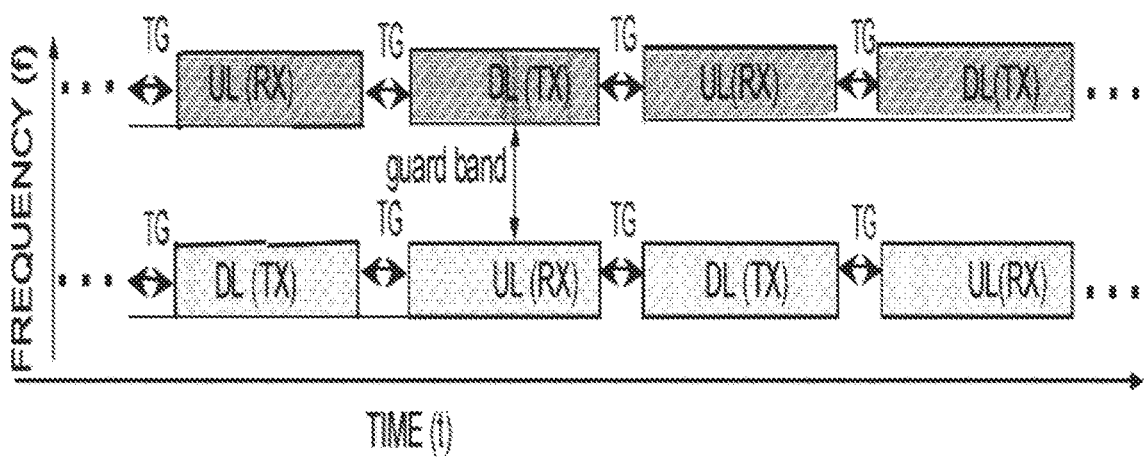

The second method is to use two TDD channels operating side by side. In the method, the two channels do not operate independently. Instead, when one channel is in Tx mode, the other will be in Rx mode and vice-versa, as shown in FIG. 17b. Under this scenario, also referred to as dual-TDD, the TBP of the Tx weights is no longer an issue since the Tx STAP weights are computed from the same training data as the Rx STAP weights in the same band. Latency is no longer dependent on the frame size. The additional latency (relative to conventional FDD) is the length of the time guard periods. This additional overhead can be made smaller by increasing frame size up to the coherence time of the channel.

In both scenarios, the DL and UL always have the same bandwidth even if the traffic patterns are not symmetric. The symmetry issue can be addressed with a hybrid dual-TDD/conventional TDD tri-band solution. Two of the three bands are used in dual-TDD mode, while the third band is used in conventional TDD mode. The conventional TDD is used to control the DL/UL channel allocations, and mostly for delay-tolerant traffic, while the dual-TDD is used to low-latency traffic.

Beamforming in FDD systems

If a system is constrained to FDD for legacy reasons, the role of STAP becomes limited to only receive beamforming. In addition, most of the beamforming benefits will be limited to the CN (BS) where most of the DOFs are located. In other words, most of the capacity scaling will occur at the UL, which carrier the smaller chunk of the overall traffic. Therefore, in general, there is limited value in scaling the capacity of the UL while keeping the DL constant. However, some of these trends are changing. First, the DL capacity is already much larger than the UL capacity in most cellular systems 75. Second, the traffic gap between the DL and UL is shrinking as more users are increasingly using applications with symmetric bandwidth requirements (e.g VoIP and video conferencing) and are increasing uploading photos and videos. Therefore, using spatial multiplexing on the UL can serve to bridge gap with the DL. Even if the UL capacity starts exceeding the DL capacity as a result of using STAP, then this presents an opportunity to reuse some of the UL spectrum of different purposes. Furthermore, the DL capacity can be improved by using sub-optimal STAP that relies on limited feedback. This feedback can come in several forms. First, some information can be obtained from UL processing. If the channel response at the CN has a narrow angular spread, which is usually the case when the CN is mounted at a high point, then the DOD/AOD of the envelope that encompasses the paths containing the bulk of the energy at the DL can also be estimated. With knowledge of the DOD, the energy can be better focused at the target EN, maximizing the SINR. The second form of feedback, comes from explicit feedback from the EN on UL. Since the wireless channel is time varying especially in mobile networks, the latency associated with explicit feedback may render it incapable of closely tracking nulls in the channel 76. Also, the amount CSI that the EN sends back must be such that it allows tracking od DOA/DOD and maximizing the beamforming gain while not eating too much of the UL bandwidth. The CN can use this feedback to further optimize the DL beams.

If the CN can determine the DOA of the EN to reasonable degree of accuracy, then different CNs can coordinate when assigning channel resources to different ENs. The ENs that least overlap spatially can be assigned more overlapping channel resources, and thus reducing the intercell interference.

QoS Control

The delay and bandwidth requirements differ depending on the type of traffic load. On the one hand, web traffic and file transfer usually require high throughput but can be very tolerant of delays. Such traffic is sometimes referred to as best-effort traffic. On the other hand, applications like real-time voice, video and gaming have very tight latency requirements (the throughput varies). If these application share the same channel, then this channel must be both high throughput and low latency. The challenge for maintaining they two properties is that that many techniques for improving the throughput come at the expense of high latency and vice-versa. For example, if the length of code is increased and is spread over longer periods of time, then the SINR (coding gain) can be improved significantly, but the latency takes a big hit. Similarly, if the number of DOFs and STAP complexity is increased (i.e. by using multi-pass beamforming or multi-user detection), then the capacity improves, but latency suffers due to the increased computational complexity. Therefore, trying to achieve both high capacity and low latency will add a lot of cost and power overhead to the system. In order to alleviate this requirement, the different classes of traffic must be treated separately. This is usually referred to as quality of service (QOS). This section discusses different techniques for implementing QoS.

Licensed and Unlicensed Spectrum Bands

One way to better take advantage of resources is to leverage the large chunks of unlicensed spectrum below 6 GHz. The largest of these chunks are located between 5-6 GHz, especially at 5.8 GHz. The 5.8 GHz 922 unlicensed band has several properties:
- Wide bandwidth (more than 100 MHz)—→enables high data rate
- Relatively small wavelength (λ<6 cm)—→more DOFs can be packed in less space
- NLOS propagation characteristics, but worse than lower bands—→advantage STAP based systems,
- lower interference from outside the network
- Restrictions on maximum Tx power and EIRP—→advantage STAP based systems, lower interference from outside the network The wideband feature presents a great opportunity for transmitting large amounts of best-effort traffic. By utilizing the large number of DOFs available (both spatial and temporal) and leverage more sophisticated beamforming (multi-user detection, and multipass STAP) and coding algorithms, which have more latency, the 5.8 GHz band (and similar bands) can achieve the desired reliability in the presence of outside (uncontrolled) interference.

Using these techniques, if the network has access to both licensed and wider unlicensed bands, then the licensed portion of the bands can be utilized for high priority, high QoS, and low latency traffic, and the unlicensed portion for high throughput/best-effort traffic. If the network has only access to licensed spectrum (unlicensed), then the band can be partitioned to two parts, one dedicated for high QoS and another best-effort As for real-time and high QoS traffic, the link reliability and latency can be improved by lowering the modulation level. The lower modulation levels achieve much lower loss with shorter codes, resulting in much lower packet loss rates.

In-Band Access/Backhaul System

A hybrid (in-band) access/backhaul system is an example where good resource management can improve the overall performance of the system. A hybrid access/backhaul system is a two-hop network. In the last hop is the access component, the ENs are the mobile devices, and the CNs emulate the cellular base stations. In the first hop (the backhaul component), the CN cellular base stations act as ENs, and the CNs are connected to the core network through a broadband link, a hybrid access/backhaul system is attractive for network operators that own/operate a single frequency band, and would to utilize as much as possible on the access side. The access and backhaul components have different properties and traffic patterns. The key differences are the following:

- In access systems, the ENs are mobile, and thus the wireless channels are likely to have a high rate of variations. The consequence of this is to limit the TBP, and thus the maximum achievable bandwidth. Even in fixed access systems, ENs are usually deployed in environments with many moving parts (e.g. indoors). The backhaul links are expected to have channels with much less variation.
- The ENs in access systems (fixed or mobile) are limited in terms of size and processing power. This limits both the spatial and temporal DOFs, also limiting the maximum achievable capacity. Fixed access usually has less restrictions than mobile access, but is not as flexible as backhaul.
- The traffic on access links is statistical in nature. That means that these links can be idle for long periods of time. On the other hand, the backhaul link is active most of the time (near full capacity) since it is an aggregate of a large number of access links.
- Access ENs are likely to enter and leave the network (and move from one network to another) much more frequently than backhaul ENs.

As a consequence of these factors, the maximum achievable spectral efficiency on the backhaul system is much larger than the best that can be achieved in an access system, fixed or mobile. Therefore, treating both backhaul and access traffic patterns the same is not optimum. To get the maximum capacity, the band needs to be partitioned between access and backhaul, with the access partition 3-4× larger than the backhaul partition due to the lower spectral efficiency 78. Similar ideas can be applied when the network is composed of nodes of different properties (e.g. when some nodes are more mobile that others). In this case, the band can be partitioned with each partition optimized for different properties.

On the access side, the CN (BS) might be able spatially multiplex more ENs (mobiles) than the number of CNs which an EN can simultaneously connect to on the backhaul side. This may reduce some of the gap in the spectral efficiency.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A communication system comprising:
a transceiver configured to provide a first time division duplex (TDD) link over a first radio frequency (RF) channel and a second TDD link over a second RF channel using dual time division duplexing (dual-TDD), the first TDD link and the second TDD link each having an uplink portion and a downlink portion, the first TDD link having a first frequency different from the second TDD link having a second frequency;
the transceiver further configured to communicate such that there is an overlap between the downlink portion of the first TDD link and the uplink portion of the second TDD link;
the transceiver further configured to receive on the first TDD link during at least a portion of time the transceiver is configured to transmit on the second TDD link; and
the transceiver further configured to perform beamforming for the uplink portion and the downlink portion based at least on receive weights and transmit weights, wherein training data used to compute the receive weights and the transmit weights are the same in the same RF channel.

2. The communication system of claim 1, wherein the transceiver further comprises an array of antennas and a space-time adaptive processing system configured to control the array of antennas and communicate, using the controlled array of antennas, over the first RF channel and the second RF channel using the dual-TDD.

3. The communication system of claim 1, wherein the transceiver is further configured to communicate over both the first RF channel and the second RF channel using dual-TDD, and wherein the first RF channel and the second RF channel are both an uplink channel and a downlink channel that operate dependently with each other.

4. The communication system of claim 2, wherein the space-time adaptive processing system is configured to perform beamforming for the uplink channel, the downlink channel, or combinations thereof, based at least on the receive weights and the transmit weights.

5. The communication system of claim 4, wherein the transmit weights are the same as the receive weights.

6. A method comprising:
providing, using a transceiver, a first time division duplex (TDD) link over a first radio frequency (RF) channel;
providing, using the transceiver, a second TDD link over a second RF channel, the first TDD link and the second TDD link each having an uplink portion and a downlink portion, the first TDD link having a first frequency different from the second TDD link having a second frequency, wherein the providing utilizes dual-TDD for one or more data frames in each RF channel;
communicating, using the transceiver, such that there is an overlap between the downlink portion of the first TDD link and the uplink portion of the second TDD link, wherein the transceiver receives on the first TDD link during at least a portion of time the transceiver transmits on the second TDD link; and
beamforming, using the transceiver, for the uplink portion and the downlink portion based at least on receive weights and transmit weights, wherein training data used to compute the receiver weights and the transmit weights are the same in the same RF channel.

7. The method of claim 6, further comprising:
controlling, by a space-time adaptive processing system in communication with the transceiver, an array of antennas; and
communicating, using the array of antennas in communication with the transceiver, over the first RF channel and the second RF channel utilizing the dual-TDD.

8. The method of claim 7, wherein the first RF channel and the second RF channel are both an uplink channel and a downlink channel that operate dependently with each other.

9. The method of claim 8, further comprising:
determining, by the space-time adaptive processing system, the receive weights and the transmit weights, wherein the transmit weights are the same as the receive weights; and
beamforming, by the space-time adaptive processing system, and for the uplink channel, the downlink channel, or combinations therefore, based at least on the determined receive weights and transmit weights.

10. At least one non-transitory computer-readable storage medium including instructions that, when executed by one or more processors of a transceiver, cause the transceiver to perform operations comprising:
provide a first time division duplex (TDD) link over a first radio frequency (RF) channel;
provide a second TDD link over a second RF channel, wherein the first TDD link and the second TDD link each have an uplink portion and a downlink portion,
wherein the first TDD link has a first frequency different from the second TDD link having a second frequency, and wherein providing the first TDD link and the second TDD link utilizes dual-TDD for one or more data frames in each RF channel;
communicate such that there is an overlap between the downlink portion of the first TDD link and the uplink portion of the second TDD link,
wherein the transceiver receives on the first TDD link during at least a portion of time the transceiver transmits on the second TDD link; and
beamform for the uplink portion and the downlink portion based at least on receive weights and transmit weights, wherein training data used to compute the receive weights and the transmit weights are the same in the same RF channel.

11. The at least one non-transitory computer-readable storage medium of claim 10, wherein the instructions further cause the transceiver to:
control, by a space-time adaptive processing system in communication with the transceiver, an array of antennas; and
communicate using the array of antennas in communication with the transceiver, over the first RF channel and the second RF channel utilizing the dual-TDD.

12. The at least one non-transitory computer-readable storage medium of claim 11, wherein the first RF channel and the second RF channel are both an uplink channel and a downlink channel that operate dependently with each other.

13. The at least one non-transitory computer-readable storage medium of claim 11, wherein the instructions further cause the transceiver to:
determine, by the space-time adaptive processing system, the receive weights and the transmit weights; and
beamforming, by the space-time adaptive processing system, and for the uplink channel, the downlink channel, or combinations therefore, based at least on the determined receive weights and transmit weights.

14. The at least one non-transitory computer-readable storage medium of claim 13, wherein the transmit weights are the same as the receive weights.

15. The communication system of claim 5, wherein the training data used to compute the transmit weights and training data used to compute the receive weights are the same.

16. The communication system of claim 1, wherein a bandwidth of the downlink portion of the first TDD link and a bandwidth of the uplink portion of the second TDD link are the same.

17. The method of claim 9, wherein the training data used to compute the transmit weights and training data used to compute the receive weights are the same.

18. The method of claim 6, wherein a bandwidth of the downlink portion of the first TDD link and a bandwidth of the uplink portion of the second TDD link are the same.

19. The at least one non-transitory computer-readable storage medium of claim 14, wherein the training data used to compute the transmit weights and training data used to compute the receive weights are the same.

20. The at least one non-transitory computer-readable storage medium of claim 10, wherein a bandwidth of the downlink portion of the first TDD link and a bandwidth of the uplink portion of the second TDD link are the same.

21. The communication system of claim 1, wherein the transceiver further configured to provide a third TDD link over a third RF channel, the transceiver configured to use the third TDD link to control uplink and downlink channel allocations.

22. The method of claim 6, the method further comprising using, by the transceiver, a third TDD link over a third RF channel to control uplink and downlink channel allocations.

23. The at least one non-transitory computer-readable storage medium of claim 10, wherein the instructions further cause the transceiver to use a third TDD link over a third RF channel to control uplink and downlink channel allocations.

* * * * *